US007555301B2

(12) United States Patent
Skafidas et al.

(10) Patent No.: US 7,555,301 B2
(45) Date of Patent: *Jun. 30, 2009

(54) METHOD AND APPARATUS FOR COVERAGE AND THROUGHPUT ENHANCEMENT IN A WIRELESS COMMUNICATION SYSTEM

(75) Inventors: Efstratios Skafidas, Coburg (AU); Ben Jones, Austin, TX (US); John (Jack) Morton, Austin, TX (US); Mike Gibson, Austin, TX (US); Neil Patrick Kelly, Austin, TX (US); Nestor Fesas, Austin, TX (US); Mark William Benson, Austin, TX (US); Richard John Rusnak, Austin, TX (US); James Glick, Lexington, TX (US); Duy Khuong Do, Melbourne (AU); Douglas A. Mammosser, Austin, TX (US); Lei Cheng, Austin, TX (US); Kevin Sean Broe, Austin, TX (US); Natarajan Ekambaram, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 255 days.

This patent is subject to a terminal disclaimer.

(21) Appl. No.: 11/507,827

(22) Filed: Aug. 21, 2006

(65) Prior Publication Data

US 2006/0281412 A1 Dec. 14, 2006

Related U.S. Application Data

(63) Continuation of application No. 10/870,199, filed on Jun. 16, 2004, now Pat. No. 7,136,655, and a continuation-in-part of application No. 10/615,208, filed on Jul. 7, 2003, now Pat. No. 7,248,877.

(60) Provisional application No. 60/492,017, filed on Aug. 1, 2003, provisional application No. 60/428,456, filed on Nov. 21, 2002.

(51) Int. Cl.
*H04Q 7/20* (2006.01)

(52) U.S. Cl. .................... 455/450; 455/452.1; 455/453; 455/509; 455/63.1; 455/447; 370/329

(58) Field of Classification Search ......... 455/450–453, 455/446–447, 455, 509–517, 63.1, 63.4, 455/562.1, 129; 370/302, 329, 338, 341, 370/347, 445
See application file for complete search history.

(56) References Cited

U.S. PATENT DOCUMENTS 4,101,901 A 7/1978 Kommrusch
(Continued)

FOREIGN PATENT DOCUMENTS

EP 1 096 730 A1 5/2001
(Continued)

OTHER PUBLICATIONS

European Patent Office, "Communication Pursuant to Article 96(2) EPC," App. No. 04801902.0, dated Sep. 1, 2006, 8 pages.
(Continued)

*Primary Examiner*—Kamran Afshar
(74) *Attorney, Agent, or Firm*—Hickman Palermo Truong & Becker LLP

(57) ABSTRACT

A multiple access wireless communications architecture provides selective, simultaneous communications with wireless devices located in different sections of a spatial area around a communications apparatus referred to as "sectors". In one embodiment, channel allocation techniques for increasing one or more of throughput and coverage in a wireless communications environment. In one embodiment, a mode of operation is selected from a plurality of modes of operation, enabling a wireless communications transmitter to be dynamically configured to reach a wireless communications devices at a greater distance from the transmitter without increased interference between communications channels ("range mode") or to provide wireless communications to a greater number of wireless communications devices within a relatively closer distance to the wireless transmitter ("capacity mode") or to provide wireless communications using a single channel to provide wireless communications at a relatively greatest distance from the transmitter ("super range mode").

18 Claims, 20 Drawing Sheets

U.S. PATENT DOCUMENTS

| | | | |
|---|---|---|---|
| 5,835,859 A * | 11/1998 | Doner | 455/447 |
| 6,470,183 B1 | 10/2002 | Herrig | |
| 6,480,506 B1 * | 11/2002 | Gubbi | 370/468 |
| 6,529,488 B1 * | 3/2003 | Urs et al. | 370/330 |
| 6,694,140 B2 * | 2/2004 | Klank | 455/452.1 |
| 7,054,286 B2 * | 5/2006 | Ertel et al. | 370/329 |
| 7,106,715 B1 * | 9/2006 | Kelton et al. | 370/338 |
| 7,136,655 B2 * | 11/2006 | Skafidas et al. | 455/450 |
| 7,248,877 B2 * | 7/2007 | Skafidas et al. | 455/450 |
| 7,333,068 B2 | 2/2008 | Biddulph | |
| 2002/0159405 A1 * | 10/2002 | Garrison et al. | 370/328 |
| 2002/0176381 A1 * | 11/2002 | Hammel et al. | 370/329 |
| 2003/0212787 A1 * | 11/2003 | Qiu et al. | 709/224 |
| 2004/0001429 A1 * | 1/2004 | Ma et al. | 370/210 |
| 2004/0053620 A1 * | 3/2004 | Garrison et al. | 455/448 |
| 2004/0259563 A1 | 12/2004 | Morton et al. | |
| 2006/0009226 A1 | 1/2006 | Vicharelli et al. | |
| 2006/0281412 A1 | 12/2006 | Skafidas et al. | |

FOREIGN PATENT DOCUMENTS

| | | |
|---|---|---|
| EP | 1 231 807 A3 | 8/2002 |
| WO | WO 97/14259 | 4/1997 |
| WO | WO 98/24258 | 6/1998 |

OTHER PUBLICATIONS

European Patent Office, "Extended European Search Report", EP Application No. 06014053.0-2416, dated Dec. 21, 2006, 13 pgs.

Stern, Jim H., "Fixed Cell Assignments for Forward Link in Broadband Wireless Networks," 2000, IEEE, pp. 1-6.

European Patent Office, "Communication pursuant to Article 96(2) EPC," EP App. 03783375.3, dated Apr. 4, 2007, 7 pages.

European Patent Office, "Partial European Search Report", EP Application No. 06014053.0-2416, dated Sep. 18, 2006, 6 pgs.

* cited by examiner

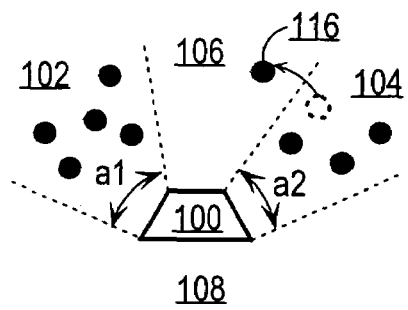
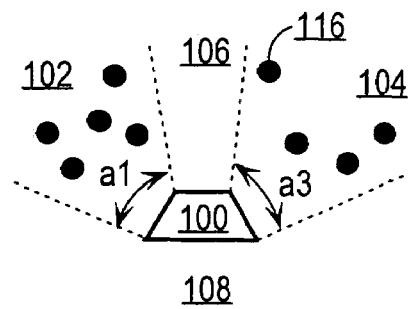
Fig. 1E          Fig. 1F
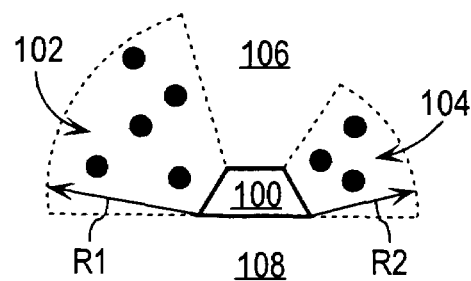
Fig. 1G

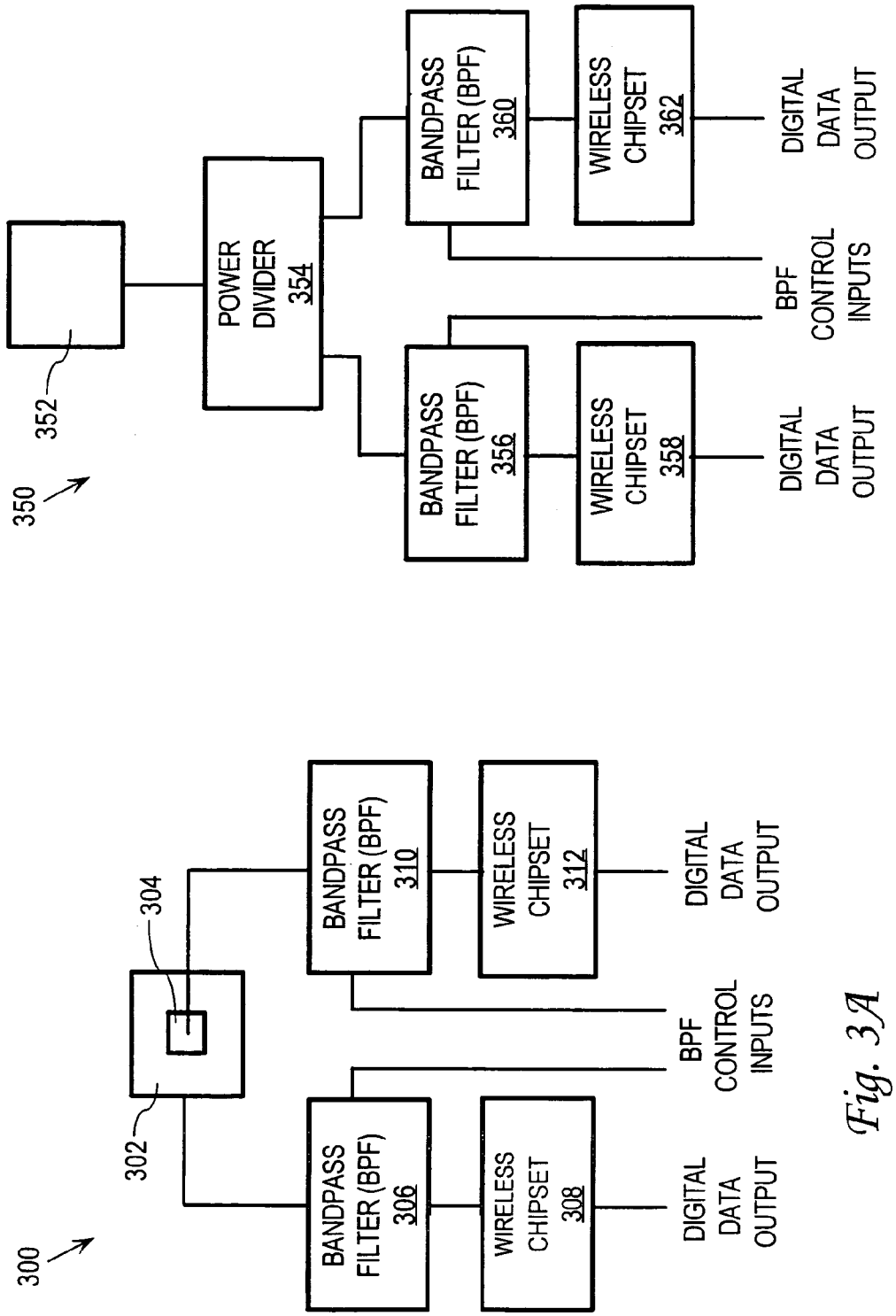

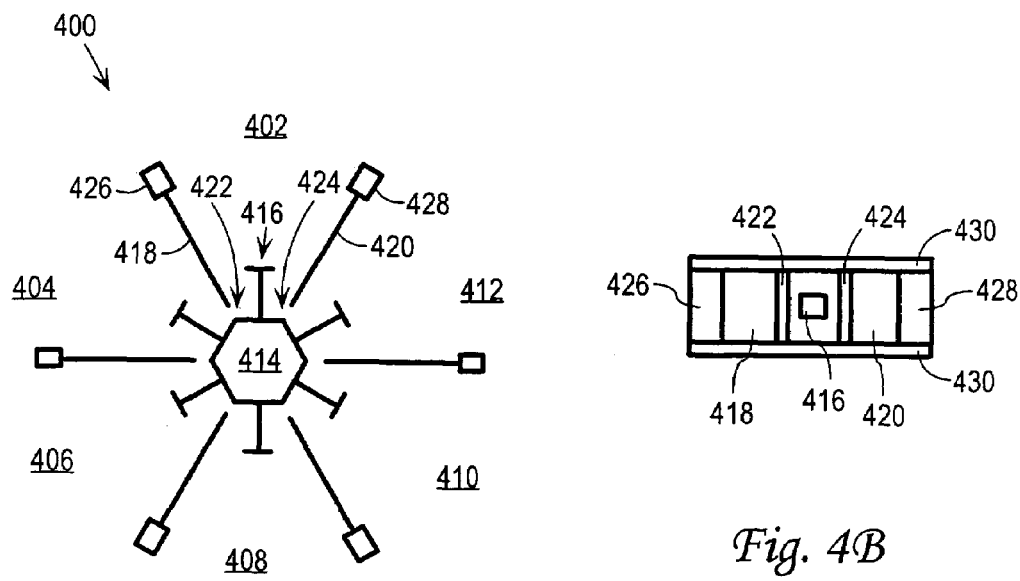
Fig. 4A
Fig. 4B
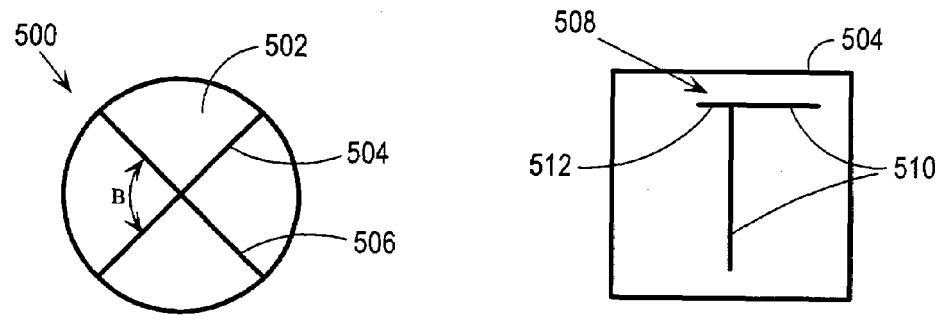
Fig. 5A
Fig. 5B

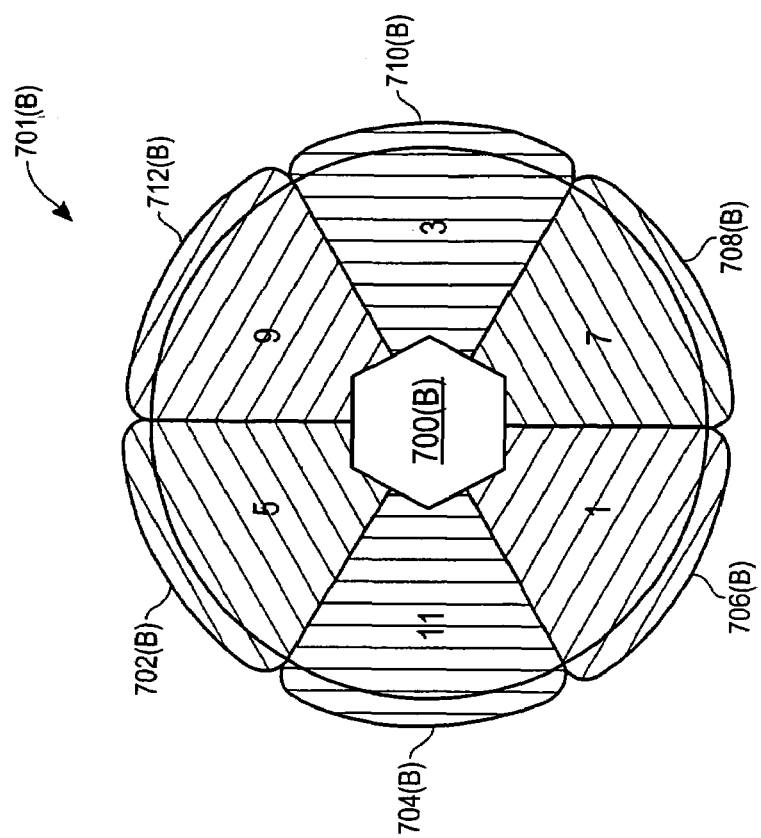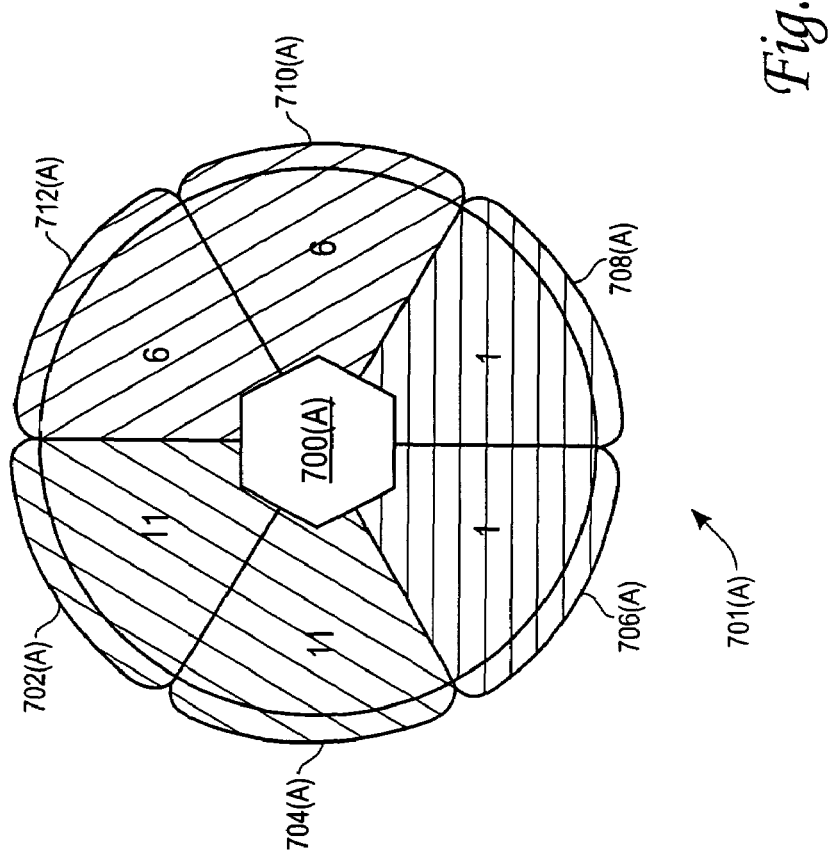
Fig. 7

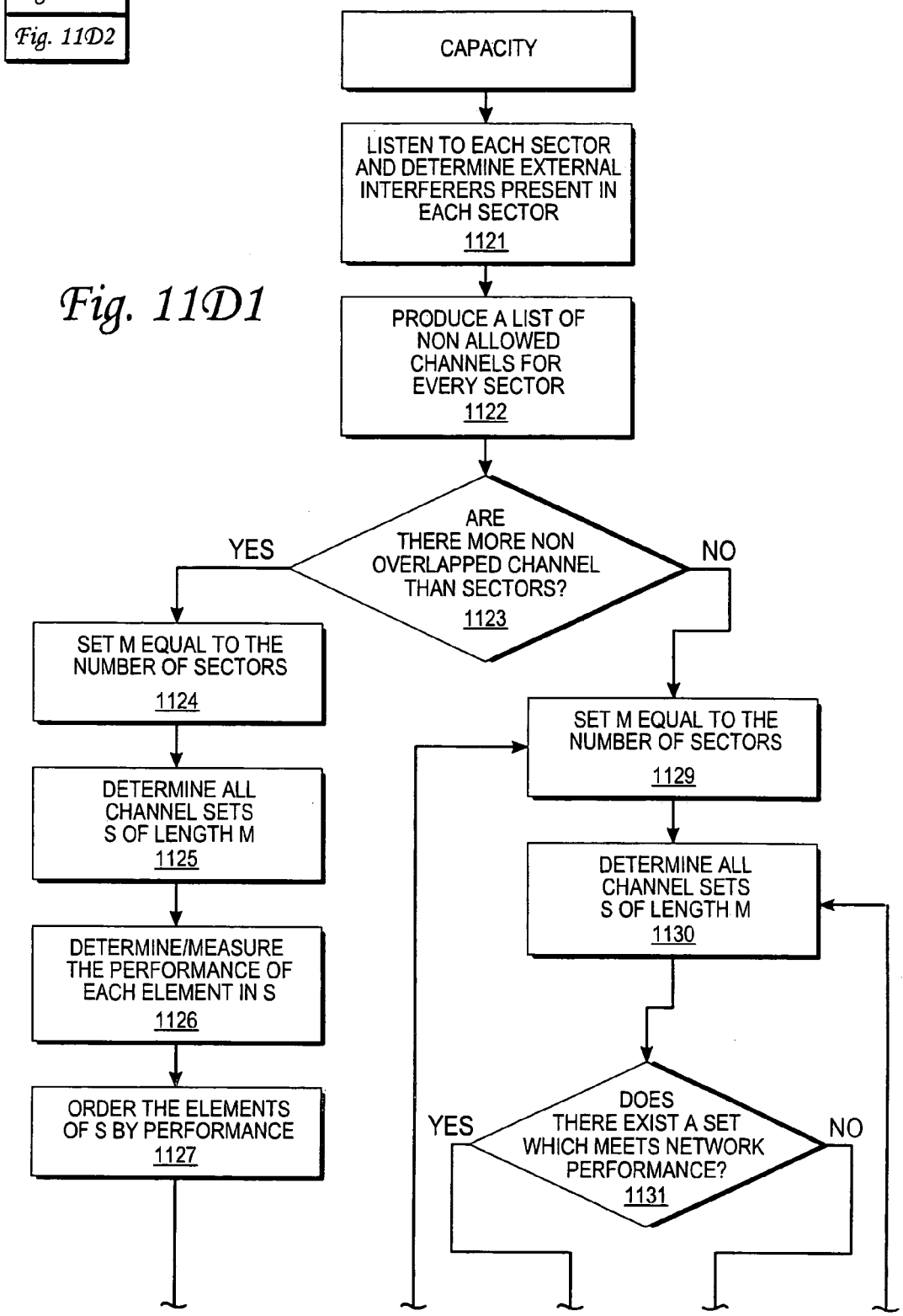

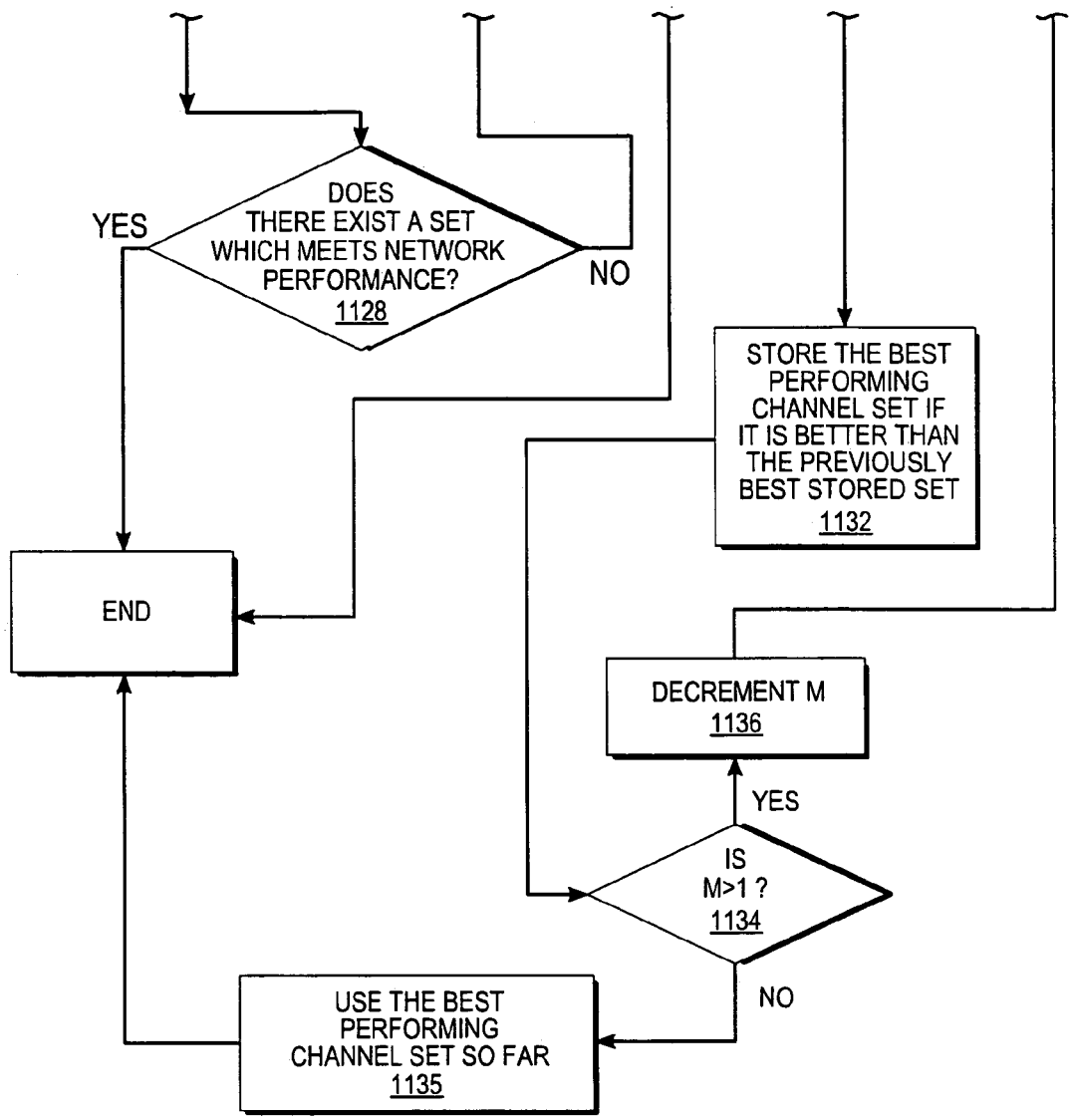
Fig. 11D2

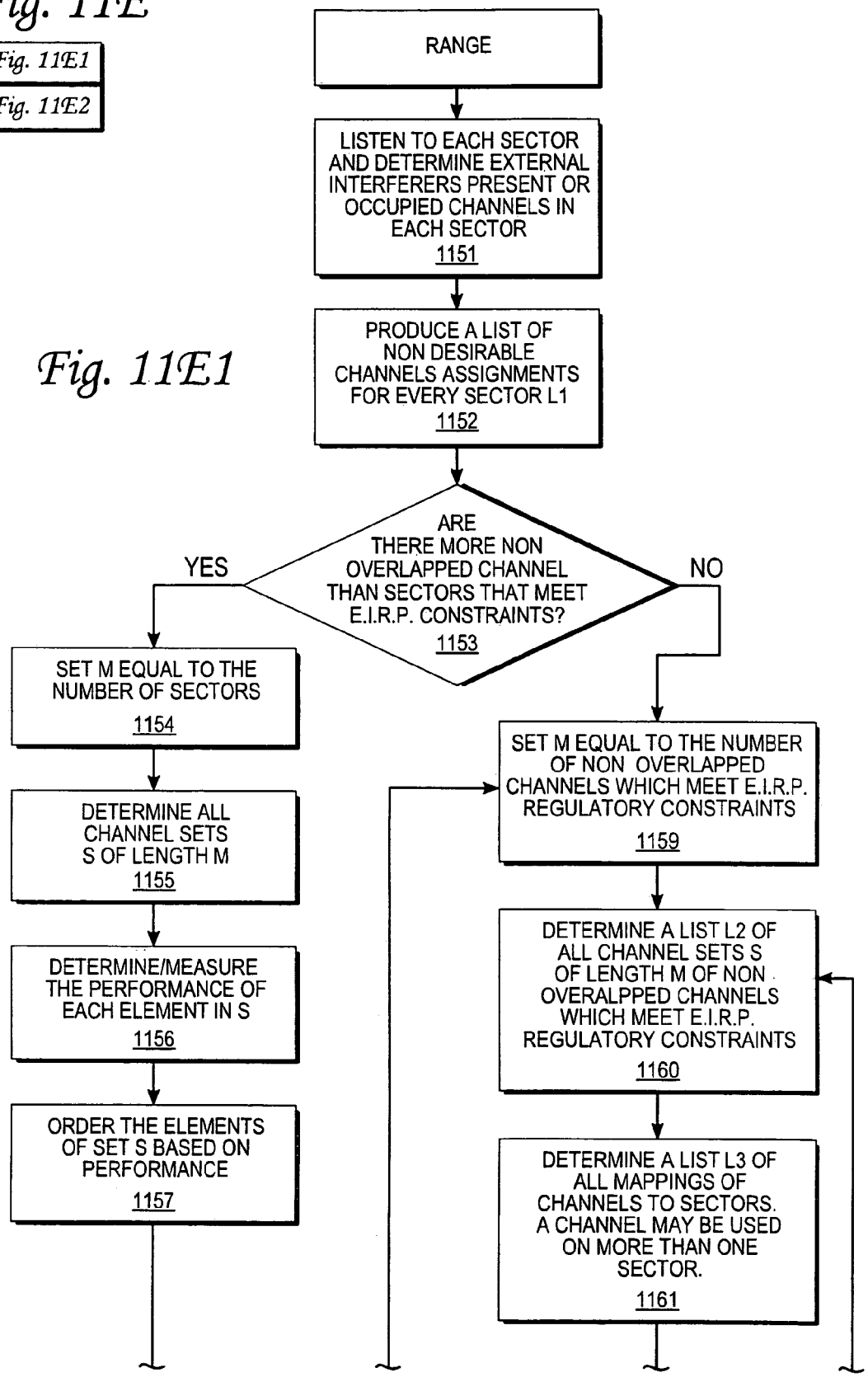

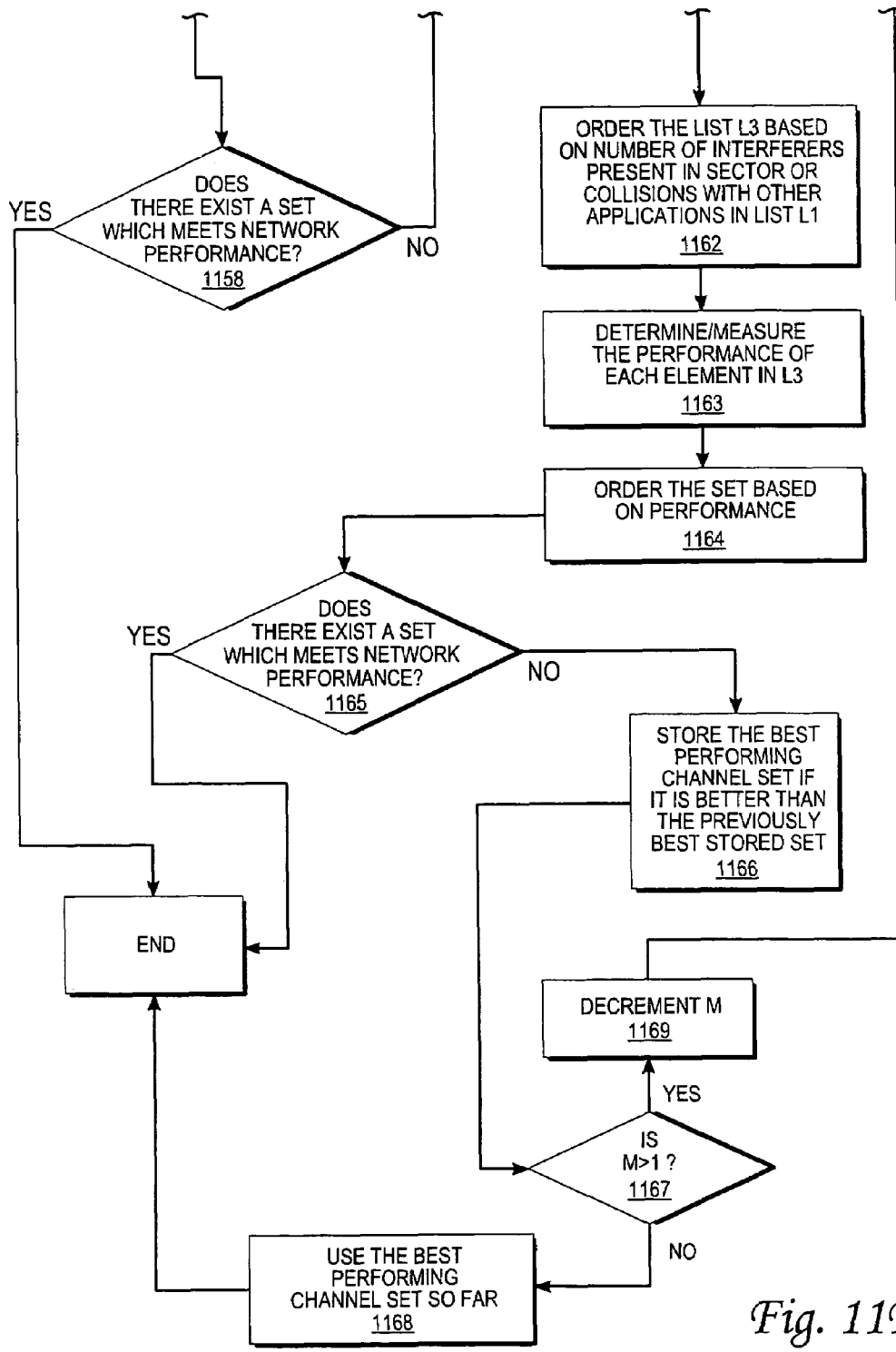
Fig. 11E2

Fig. 11F1

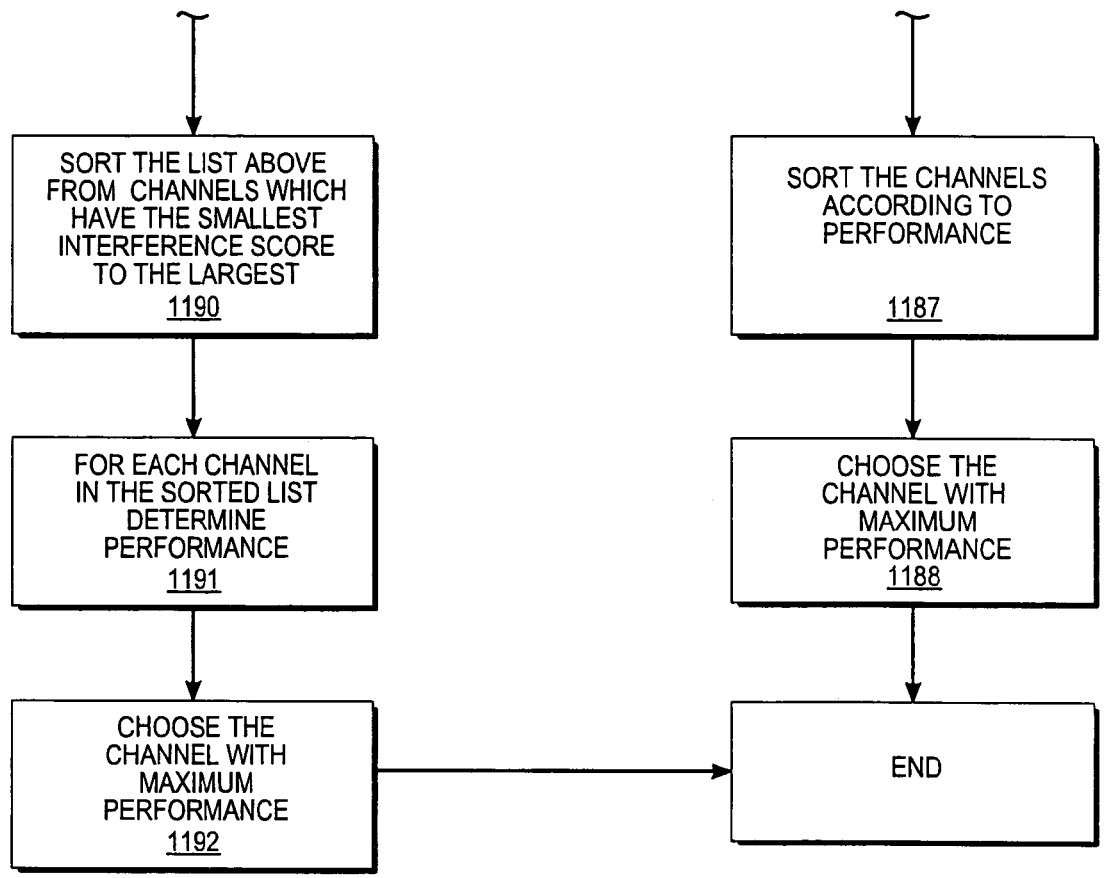
Fig. 11F2

METHOD AND APPARATUS FOR COVERAGE AND THROUGHPUT ENHANCEMENT IN A WIRELESS COMMUNICATION SYSTEM

RELATED APPLICATIONS AND CLAIM OF PRIORITY

This application is a Continuation of a U.S. Non-provisional Patent Application No. 10/870,199, entitled "METHOD AND APPARATUS FOR COVERAGE AND THROUGHPUT ENHANCEMENT IN A WIRELESS COMMUNICATION SYSTEM," filed Jun. 16, 2004 now U.S. Pat. No. 7,136,655, which in turn claims (a) the benefit of U.S. Provisional Patent Application No. 60/492,017 entitled, "Wireless Communication Architecture," filed Aug. 1, 2003 and (b) is a Continuation-In-Part of a U.S. Non-provisional patent application Ser. No. 10/615,208, entitled, "Multiple Access Wireless Communications Architecture," filed Jul. 7, 2003 now U.S. pat. No. 7,248,877, which in turn claims priority from U.S. Provisional Patent Application No. 60/428,456, entitled "Approach For Using Spatial Division To Increase Throughput In A Wireless Communication System," filed Nov. 21, 2002, the contents of all of which are incorporated herein by reference in its entirety for all purposes.

This application is related to pending U.S. Non-provisional Patent Application No. 10/858,936, entitled "Method and Apparatus for Sector Channelization and Polarization for Reduced Interference in Wireless Networks," filed Jun. 1, 2004, the contents of which are incorporated herein by reference in its entirety for all purposes.

FIELD OF THE INVENTION

This invention relates generally to wireless communications systems and, more specifically, to enhancing coverage and throughput in a wireless communications architecture.

BACKGROUND OF THE INVENTION

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A communications network is any system or mechanism that provides for the exchange of information or data between participants. In existing wireless communications networks, such as a wireless Local Area Networks (LANs) or Personal Area Networks (PANs), a wireless access point functions as a transceiver in communicating with a number of wireless devices. As used herein, the term "wireless device" refers to any type of device that uses a wireless communications protocol to communicate. Example wireless devices include, without limitation, desktop, laptop and handheld computers, Personal Digital Assistants (PDAs), cell phones and various other portable devices. The radiation pattern of wireless access points is usually omni directional, i.e., the wireless access point transmits information in 360 degrees, so that all wireless devices within range of the wireless access points receive all transmitted signals. Wireless access points also perform various management functions, such as selecting specific frequencies on which to transmit data to particular wireless devices in the system.

One ongoing issue with wireless communications architectures is how to increase the number of wireless devices that can simultaneously communicate within a specified physical area given a fixed amount of allocated electromagnetic spectrum. This is particularly important when a number of wireless devices in the specified area are attempting to simultaneously communicate with a wireless access point to access a communications network, such as the Internet. For example, it is not uncommon for large numbers of users to use laptop computers to access the Internet during tradeshows and conferences. As another example, in some corporate offices, many users share wireless access points to access the Internet with laptop computers. As yet another example, many coffee shops now offer free wireless Internet access to customers. All of these situations strain the available access resources since only a limited number of available communications channels must be shared by all participants. For example, the IEEE 802.11(b) standard in the FCC regulatory domain, sometimes referred to as "WiFi", defines 11 communications channels. Thus, assuming that each channel is dedicated to a single user, only 11 users can communicate simultaneously.

Conventional approaches for addressing this problem include employing multiple access communications protocols to increase the number of wireless devices that can simultaneously access a wireless access point. Example multiple access communications protocols include, without limitations, Frequency Division Multiple Access (FDMA), Time Division Multiple Access (TDMA) and Code Division Multiple Access (CDMA). The use of multiple access communications protocols can significantly increase the number of wireless devices that can operate simultaneously on a specified set of communications channels. For example, the use of TDMA can increase the number of wireless devices that can share a specified set of communications channels compared to FDMA. Even using TDMA however, a wireless access point can communicate to only one wireless device in any one timeslot. Furthermore for any wireless device to communicate to another wireless device or to the wired network, it must transmit its data to the wireless access point. The wireless access point then transmits the data to another wireless device or to the wired infrastructure, such as the Internet. The throughput of the network is therefore necessarily limited by the throughput of communications between the wireless access point and any one wireless device at a particular point in time. Consequently, in conventional systems, the amount of data that can be transferred at any one timeslot is equal to the throughput of the link from the wireless access point to the particular wireless device to which it is communicating. All other wireless devices are in a state waiting for a free time slot to transmit or receive a quantum of data.

Cross-channel interference is another issue confronting conventional approaches. In the previously described example of the IEEE 802.11(b) standard in the FCC regulatory domain, the 11 communications channels often overlap one another. Thus, assuming that two users are each using different but overlapping channels, the two users' communications could interfere with one another.

Management and growing of networks of Wireless Access Points is a complicated process. Adding another wireless access point generally requires one to adjust the power and channel assignments of access points in the vicinity of a new access point in order to avoid interference.

Based on the foregoing, there is a need for a wireless communications architecture that does not suffer from limitations in prior approaches. There is a particular need for a wireless communications architecture that allows a greater number of wireless devices to communicate substantially simultaneously with little or no interference.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-1G are functional diagrams of a wireless communications apparatus configured in accordance with an embodiment of the invention.

FIG. 3A is a block diagram that depicts a wireless communications architecture configured in accordance with an embodiment of the invention.

FIG. 3B is a block diagram that depicts a wireless communications architecture configured in accordance with an embodiment of the invention.

FIG. 4A is a block diagram that depicts a top view of an antenna apparatus configured in accordance with an embodiment of the invention.

FIG. 4B is a side view of the antenna apparatus of FIG. 4A.

FIG. 5A is a block diagram of an end view of a radiating assembly configured in accordance with an embodiment of the invention.

FIG. 5B is a block diagram that depicts a patch element configured according to an embodiment of the invention.

FIG. 7 is a block diagram illustrating example modes of operation of an example device in an embodiment of the invention.

FIGS. 11A-11F are operational flow diagrams illustrating the operation of embodiments of the invention.

DETAILED DESCRIPTION OF THE INVENTION

Figure 1A:
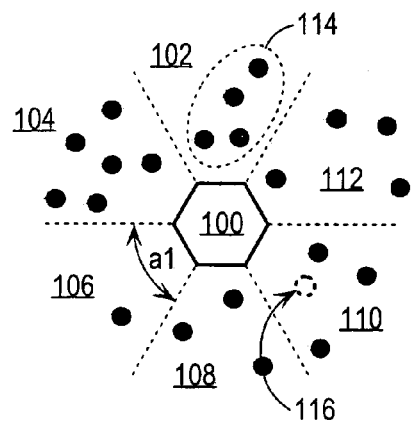

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
II. OPERATIONAL OVERVIEW
III. WIRELESS COMMUNICATIONS APPARATUS
IV. COMMUNICATIONS CHANNELS, PROTOCOLS AND MULTIPLE ACCESS SCHEMES
V. INTERFERENCE MITIGATION AND POWER CONTROL
VI. ANTENNA CONFIGURATIONS
VII. LOGICAL SECTORING
VIII. IMPLEMENTATION MECHANISMS, ALTERNATIVES & EXTENSIONS

I. OVERVIEW

As described in this disclosure, in one embodiment, a sectorized access point with the capability to tailors its configuration can provide the ability to reduce network disruption and to also increase network performance. A sectorized access point refers to a wireless access point that allocates channels to sectors, spatial regions proximately located to the access point. In sectorized access point installations, channel to sector assignments are determined for the installation in which wireless devices surround the wireless communications transmitter in a relatively confined region. But some sites may require wireless communications at a greater distance from the wireless communications transmitter than other sites. On the other hand, some installations may have a relatively greater number of devices in relatively closer proximity to the wireless communications transmitter. The channel to sector assignment should be determined based not just on reducing overall interference, but also on the characteristics of the wireless transmitter, the number and proximity of wireless devices with which the wireless transmitter is to communicate, regulatory Equivalent Isotropically Radiated Power (EIRP) constraints and so forth. It is also observed that in some situations, it is advantageous to have sectors with shapes other than a "pie shaped" wedge. For example, an installation may desire to provide wireless communications in a rectangular shaped room. In such an installation, it would be desirable to extend wireless communications coverage into the corners of the rectangle, while at the same time limit the range of the signal at the sides of the rectangle to prevent interference with another office's installation. Growth and change further compound the allocation problem, because a channel allocation that works today may not work tomorrow.

The present invention provides in an embodiment channel allocation techniques for increasing one or more of throughput and coverage in a wireless communications environment. In one embodiment, a mode of operation is selected from a plurality of modes of operation, enabling a wireless communications transmitter to be dynamically configured to reach a wireless communications devices at a greater distance from the transmitter without increased interference between communications channels ("range mode") or to provide wireless communications to a greater number of wireless communications devices within a relatively closer distance to the wireless transmitter ("capacity mode") or to provide wireless communications using a single channel to provide wireless communications at a relatively greatest distance from the transmitter ("super range mode"). In one embodiment, the device selects channels having a high channel rejection and isolation when operating in range mode to reduce inter-channel interference. In one embodiment, the device spatially allocates a relatively greater number of channels to sectors to reduce inter-channel interference between sectors when operating in capacity mode. In one embodiment, the device select a single interference free channel when operating in super range mode to provide extended range wireless communications.

In another aspect, in one embodiment, a transmitter coupled to an antenna configured to provide selective, substantially simultaneous communications with wireless devices located in different spatial areas ("sectors") around the antenna dynamically allocates channels to sectors in order to create one or more logical sectors. In one embodiment, logical sectors may comprise sectors of unequal radii. In one embodiment, logical sectors may comprise sectors of different angles. In one embodiment, logical sectors may comprise sectors driven with different power settings. In one embodiment, logical sectors may comprise adjacent sectors and/or non-adjacent sectors.

Embodiments employ multiple access communications protocol techniques to provide selective, substantially simultaneous communications with wireless devices. Embodiments can provide communications between wireless devices in a single sector, between wireless devices in different sectors and between wireless devices and a wired network or wireless backhaul network.

In one embodiment, there is provided a method for determining an assignment of wireless communications channels to a plurality of wireless communications transmitters. An input specifying a mode of operation is received. A plurality of available wireless communications channels is determined based upon a number of wireless communications transmitters in the plurality of wireless transmitters and the mode of operation. A wireless communications channel assignment that provides the specified mode of operation is determined based upon the plurality of available wireless communications channels and the number of wireless communications transmitters in the plurality of wireless transmitters.

In one embodiment, in which the mode of operation can provide for a greater range of coverage relative to other modes of operation, determining a wireless communications channel assignment based upon the plurality of available wireless communications channels and a number of wireless communications transmitters in the plurality of wireless transmitters includes determining a wireless communications channel assignment in which the wireless communications channels have a greatest frequency separation relative to the plurality of available wireless communications channels.

In one embodiment, determining a wireless communications channel assignment in which the wireless communications channels have a greatest frequency separation relative to the plurality of available wireless communications channels includes assigning a plurality of wireless communications transmitters to a shared wireless communications channel. The wireless communications transmitters assigned to the shared wireless communications channel use a multiple access communications protocol to determine availability of the shared wireless channel prior to transmitting on the shared wireless communications channel. In one embodiment, the multiple access communications protocol comprises at least one of a carrier sense, carrier detect and an energy detect mechanism.

In one embodiment, determining a wireless communications channel assignment in which the wireless communications channels have a greatest frequency separation relative to the plurality of available wireless communications channels includes determining a wireless communications channel assignment in which the wireless communications channels do not overlap.

In one embodiment, in which the mode of operation provides greater throughput relative to other modes of operation, determining a wireless communications channel assignment based upon the plurality of available wireless communications channels and a number of wireless communications transmitters in the plurality of wireless transmitters further includes determining a wireless communications channel assignment in which the wireless communications channels have a greatest bandwidth relative to the plurality of available wireless communications channels.

In one embodiment, determining a wireless communications channel assignment in which the wireless communications channels have a greatest bandwidth relative to the plurality of available wireless communications channels includes assigning each one of the plurality of wireless communications transmitters to an individual wireless communications channel, if available. Otherwise, a plurality of wireless communications transmitters is assigned to a shared wireless communications channel. The wireless communications transmitters assigned to the wireless communications channel use a multiple access communications protocol to determine availability of the wireless channel assigned to the wireless communications transmitter prior to transmitting on the wireless communications channel. In one embodiment, the multiple access communications protocol comprises at least one of a carrier sense, carrier detect and an energy detect mechanism.

In one embodiment, determining a wireless communications channel assignment in which the wireless communications channels have a greatest bandwidth relative to the plurality of available wireless communications channels includes determining a wireless communications channel assignment in which at least two of the wireless communications channels overlap.

In one embodiment, the mode of operation provides greatest range of coverage relative to other modes of operation. Determining a wireless communications channel assignment based upon the plurality of available wireless communications channels and a number of wireless communications transmitters in the plurality of wireless transmitters includes determining a wireless communications channel assignment in which a single wireless communications channel having a minimal interference relative to the plurality of available wireless communications channels.

In one embodiment, determining a wireless communications channel assignment in which a single wireless communications channel having a minimal interference relative to the plurality of available wireless communications channels includes assigning a plurality of wireless communications transmitters to the single wireless communications channel.

In one embodiment, wireless communications channels are selected from a frequency band specified by one of the IEEE 802.11(a), (b), (g), the 802.15(x), 802.16(x) and 802.20 (x) wireless communications standards.

In one embodiment, at least one wireless communications transmitter is assigned a wireless communications channel for establishing a backhaul wireless communications with a wireless backhaul system. In one embodiment the backhaul link is chosen first and then the channel allocation is determined for the sectors such as to ensure adequate performance of the distribution network.

In another aspect, in one embodiment, there is provided a method for determining an assignment of wireless communications channels to a plurality of wireless communications transmitters. An input specifying a mode of operation is received. If the mode of operation is a range mode, a wireless communications channel assignment in which the wireless communications channels have a greatest frequency separation relative to the plurality of available wireless communications channels is determined. If the mode of operation is a capacity mode, a wireless communications channel assignment in which the wireless communications channels have a greatest bandwidth relative to the plurality of available wireless communications channels is determined. If the mode of operation is a super range mode, a wireless communications channel assignment in which a singe wireless communications channel is used to obtain a greatest range relative to the plurality of available wireless communications channels is determined.

In another aspect, in one embodiment, there is provided a method for determining an assignment of wireless communications channels to a plurality of available wireless communications antenna arrangements. Each antenna arrangement from the plurality of antenna arrangements is configured to transmit and receive communications signals within a different section of a spatial area. A single wireless communications channel is assigned to be shared by at least two wireless communications antenna arrangements such that each of the at least two wireless communications antenna arrangements transmit and receive within different sections of the spatial area on the shared wireless communications channel. Each of the at least two wireless communications antenna arrangements determine availability of the shared wireless communications channel using a multiple access communications protocol prior to transmitting on the shared wireless communications channel to conduct wireless communications in different sections of the spatial area substantially contemporaneously using the shared wireless communications channel. Remaining wireless communications channels from the plurality of available wireless communications channels are assigned to remaining wireless communications antenna arrangements.

In other aspects, the invention encompasses in some embodiments, computer apparatus, computing systems and machine-readable media configured to carry out the foregoing methods.

In another aspect, in one embodiment, there is provided a wireless communications apparatus. The apparatus includes a plurality of antenna arrangements. Each antenna arrangement from the plurality of antenna arrangements is configured to transmit and receive communications signals within a different section of a spatial area around the wireless communications apparatus. A management mechanism is coupled to the plurality of antenna arrangements and is configured to assign communications channels to be used by each of the plurality of antenna arrangements. The management mechanism is configured to determine whether a communications channel is currently being used to carry communication signals before transmitting any communication signals onto the communications channel. The management mechanism is further configured to assign a particular communications channel to two or more of the plurality of antenna arrangements and to cause the two or more of the plurality of antenna arrangements to transmit communications signals on the particular communications channel substantially simultaneously.

In one embodiment, the management mechanism assigns a particular communications channel to two or more adjacent ones of the plurality of antenna arrangements. In one embodiment, the management mechanism assigns a particular communications channel to two or more non-adjacent ones of the plurality of antenna arrangements.

In one embodiment, the management mechanism causes the first antenna arrangement to transmit at a first power setting and the second antenna arrangement to transmit at a second power setting. The first power setting and the second power setting are different. In one embodiment, transmitting at different power settings in the first sector and the second sector enable the first sector and the second sector to have different radii.

In one embodiment, the management mechanism causes a first antenna arrangement of the two or more of the plurality of antenna arrangements to transmit at a first angle and a second antenna arrangement of the two or more of the plurality of antenna arrangements to transmit at a second angle to enable the first sector and the second sector to have different widths.

Some embodiments may assign frequencies to transmitters and/or antenna arrangements in accordance with a mode of operation to achieve one or more of throughput or coverage targets associated with the mode. Some embodiments may provide improved communications channel utilization using shared channel techniques. Some embodiments employing channel allocation and/or multiple access communications protocol techniques may provide increases in throughput and/or increases in the range for one or more sectors. Some embodiments may provide the ability to set the number of independent channels on a sectorized access point. Some embodiments may provide a means of setting the number of channels on a sectorized access point based on network performance (Range or Capacity). Some embodiments may provide for allocating channels to sectors such as to avoid or stop interfering with access points and to avoid interference from other noise source. Some embodiments may provide selection of a back haul link prior to channel allocation in order to reduce disruption to the backhaul link.

II. OPERATIONAL OVERVIEW

FIG. 1A is a block diagram of a wireless communications apparatus 100 configured in accordance with an embodiment of the invention. Apparatus 100 is configured to allow selective communications with wireless devices located in sectors identified by reference numerals 102, 104, 106, 108, 110 and 112. As depicted in FIG. 1A, each sector 102-112 includes one or more wireless devices. For example, sector 102 includes four wireless devices identified generally by reference numeral 114.

According to one embodiment of the invention, each sector 102-112 is a portion or section of a spatial area around apparatus 100. Each sector 102-112 may be defined by a specified angle with respect to apparatus 100. For example, sector 106 is an area defined by an angle a1, with respect to apparatus 100. Sectors 102-112 may be defined by the same angle, or different angles. In the present example, sectors 102-112 are each defined by an angle of sixty degrees. Each sector 102-112 may also be defined by radius with respect to apparatus 100.

Apparatus 100 is configured to allow selective communications with wireless devices in any number of sectors and the sectors do not need to be contiguous or provide complete coverage around apparatus 100. The number, location and size of sectors 102-112 may be selected based upon a wide variety of configuration criteria, depending upon the requirements of a particular implementation. Also, the size of sectors 102-112 may be the same, or vary, depending upon the requirements of a particular implementation. Example configuration criteria include, without limitation, the expected numbers and locations of wireless devices and physical constraints of a particular implementation. For example, when implemented in a building to provide wireless access to a network, the number and locations of wireless devices that will require wireless access to the network may be considered. Also, the locations of walls and other physical obstacles, as well as the locations of noise sources and other wireless access apparatus may also be considered. In outdoor applications, the types and locations of natural obstacles as well as buildings and other interference sources may be considered.

Figure 1B:
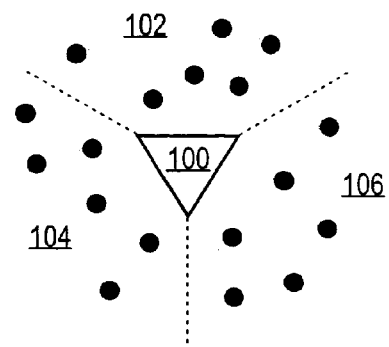
Figure 1C:
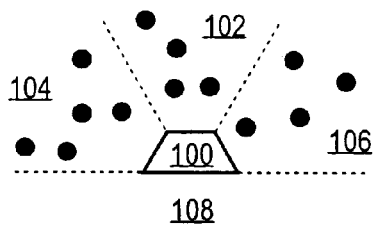
Figure 1D:
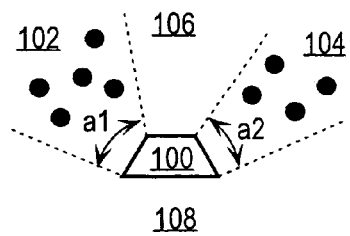

FIGS. 1B-1D depict example configurations for apparatus 100 to allow selective communications with wireless devices located in different sectors. Specifically, FIG. 1B is a block diagram of apparatus 100 configured to allow selective communications with wireless devices located in three sectors 102-106. FIG. 1C is a block diagram of apparatus 100 also configured to allow selective communications with wireless devices located in three sectors 102-106. In FIG. 1C, however, sectors 102-106 are located on one side of apparatus 100. This configuration may be used, for example, in situations where coverage is only desired in sectors 102-106 as depicted in FIG. 1C. One example situation is where apparatus 100 is physically located within a building in a location where wireless devices will only be located in sectors 102-106 as depicted in FIG. 1C with respect to apparatus 100. FIG. 1D is a block diagram of apparatus 100 configured to allow selective communications with wireless devices located in two sectors 102, 104, but not in sectors 106, 108. Sectors 102, 104 are generally angular-shaped areas defined by angles a1 and a2, respectively. This configuration may be used, for example, in situations where it is known that wireless devices are to be located in sectors 102, 104, but not in sectors 106, 108. As depicted in FIG. 1D, apparatus 100 may be configured to allow selective communications in any number of sectors, of varying sizes and locations.

Wireless communications environments often change over time. Changes may be attributable to the introduction of new noise sources or to mobile wireless devices changing locations over time. For example, in FIG. 1A, suppose that a mobile wireless device 116 moves from sector 108 to sector 110. As described in more detail hereinafter, apparatus 100 is configured to automatically detect that the move has occurred and to re-assign mobile wireless device 116 from sector 108 to 110 and perform any required updates of configuration data and data structures maintained by apparatus 100. A frequency or timeslot assigned the mobile wireless device 116 may also be changed, depending upon the requirements of a particular application. In CSMA applications, this may not be required, since mobile wireless device 116 will automatically sense when it can begin communicating in sector 110.

According to one embodiment of the invention, the configuration of apparatus 100 may be dynamically changed over time to change one or more attributes of sectors 102-112. This may include, for example, increasing or decreasing the number of sectors and/or changing the size or shape of existing sectors. The configuration of apparatus 100 may be changed for any reason. For example, apparatus 100 may be moved to a different physical location, where it is desirable to change the location or size of the sectors to provide better coverage. As another example, wireless devices may move to different locations over time.

FIG. 1E is a block diagram similar to FIG. 1D, except that a wireless device 116 has moved from sector 104 to sector 106. Since apparatus 100 is not configured to allow wireless communications in sector 106, wireless device 116 no longer has wireless communications supported by apparatus 100. As depicted in FIG. 1F, the configuration of apparatus 100 is dynamically changed to expand sector 104 to provide wireless communications for wireless device 116. The angle of sector 104 has been changed from a2, as depicted in FIG. 1E, to a3, as depicted in FIG. 1F.

Sectors may be dynamically changed to address other conditions, for example for load balancing purposes. In this situation, the size (angle) of sectors are changed to increase or decrease the number of wireless devices in particular sectors to provide better load balancing, thereby increasing throughput. Sectors may also be sub-divided into multiple sub-sectors, to further reduce the number wireless devices in any particular sub-sector. Sectors may also be overlapped, for example using different communications channels, to reduce the number of wireless devices operating on any particular communications channel.

The aforementioned reconfiguration of apparatus 100 may be performed using a variety of techniques, depending upon the requirements of a particular implementation. For example, the physical configuration of one or more antenna elements may be changed to change the size or shape of corresponding sectors. Changing the physical configuration of an antenna element may include several things, such as moving or re-orienting the antenna element, making physical adjustments to or re-sizing the antenna element, or even exchanging the antenna element with a different antenna element.

Instead of changing the physical configuration of an antenna element, the reconfiguration of apparatus 100 may be done by changing the electrical configuration of the apparatus 100 to change the associated sectors, for example using a beam forming network. The beam forming network may be configured to vary the amplitude and relative phase on each beam forming element to change the attributes of the beam, e.g., to create narrow or wide beams and to change the direction of the beams. Varactors may be used for this purpose. A point coordinator function or a distributed coordinator function may be used.

Instead of changing the physical configuration of an antenna element, the reconfiguration of apparatus 100 may be done by changing the electrical configuration of the apparatus 100 to change the associated sectors, for example by allocating the same channel frequency to adjacent sectors. This may be performed by either a power dividing network at the radio frequency level or utilizing a protocol such as CSMA or other point coordination function at the software level.

III. WIRELESS COMMUNICATIONS APPARATUS

Figure 2:
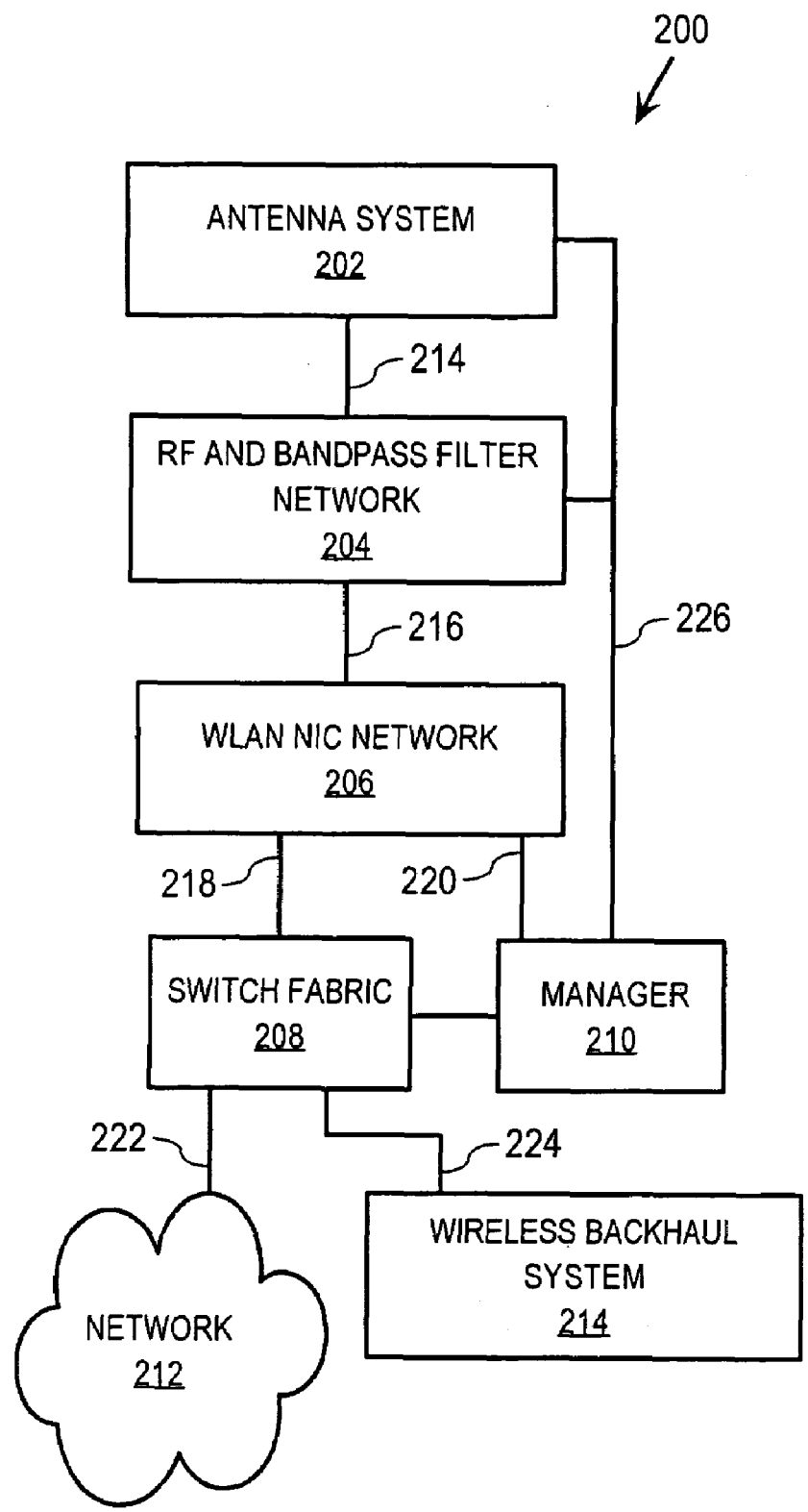
FIG. 2 is a block diagram that depicts a wireless communications apparatus configured in accordance with an embodiment of the invention.

FIG. 2 is a block diagram that depicts a wireless communications apparatus 200 configured in accordance with an embodiment of the invention. Apparatus 200 includes an antenna system 202, a Radio Frequency (RF) and bandpass filter network 204, a Wireless Local Area Network (WLAN) Network Interface Card (NIC) network 206 or silicon that performs the function of the multiplicity of WLAN transceivers, a switch fabric 208 and a manager 210.

According to one embodiment of the invention, the antenna system transmits and receives electromagnetic radiation in a particular spatial direction. The antenna system has the property that the radiation it transmits and receives other than from the desired spatial location is minimized.

According to one embodiment of the invention, the antenna system has multiple transmit and receive antennas in any sector. The wireless communication system has the property that it transmits and receives radiation from any one of the radiating elements. The communication system chooses which radiating element to transmit or receive in a particular sector to maximize performance.

According to one embodiment of the invention, RF and bandpass filter network 204 is configured to perform two functions. First, RF and bandpass filter network 204 is configured to perform band separation and separate out one or more frequency bands from the RF signals provided by antenna system 202. For example, this may involve processing the RF signal from antenna system 202 to obtain 2.4 and 5 GHz signals. Second, RF and bandpass filter network 204 is configured to perform channelization within each frequency band to improve system performance. The output of RF and bandpass filter network 204 is provided to WLAN NIC network 206.

RF and bandpass filter network 204 may include a beamforming pointing network to dynamically change the angles of sectors 102-112. This function allows the size and/or location of sectors 102-112 to be dynamically changed.

According to one embodiment of the invention, RF and bandpass filter network 204 is configured to join multiple sectors 102-112. This includes allowing a signal to be transmitted to or received from multiple sectors 102-112 simultaneously. This may be useful, for example, for increasing range in low isolation antenna systems at the expense of throughput.

According to another embodiment of the invention, RF and bandpass filter network 204 may be omitted and protocol software may provide the appearance of joint multiple sectors 102-112. This includes allowing a signal to be transmitted to or received from multiple sectors 102-112 simultaneously.

WLAN NIC network 206 is configured generally to change RF signals from RF and bandpass filter network 204 into digital signals in the form of data packets. According to one embodiment of the invention, WLAN NIC network 206 is configured to amplify the RF energy before performing frequency translation of the signal to base band separating the signal into its in-phase and quadrature components. The respective components of the signal are sampled and demodulated into their constituent bits as specified by an applicable standard, for example, the IEEE 802.11 standard. The WLAN NIC network 206 may also be configured to provide de-scrambling, error correction and low-level protocol functions, for example, RTS/CTS generation and acknowledgment, fragmentation and de-fragmentation, and automatic beacon monitoring. The decoded bits are grouped into packets, for example as specified by the IEEE standard, and then provided to switch fabric 208 and manager 210.

Switch fabric 208 is coupled between WLAN NIC network 206 and a network 212, such as a Local Area Network (LAN), Wide Area Network (WAN) or the Internet, and/or to a wireless backhaul system 214. Wireless backhaul system 214 may include a WLAN backhaul NIC and a WLAN backhaul radiating element that are not depicted in FIG. 2 for simplicity.

Manager 210 is configured to perform a variety of management and control functions in apparatus 200. The particular functions performed by manager 210 may vary, depending upon the requirements of a particular application, and the invention is not limited to manager 210 performing any particular tasks. Example management and control functions include, without limitation, managing overall system and sector configuration, managing the frequency bands, communications channels and communications protocols for each sector, managing security protocols, managing the transmit power level and receive sensitivity for each sector, detecting and alerting network administrators the presence of non-authorized or interfering access points and managing communications between wireless devices and between wireless devices and network 212 and wireless backhaul system 214. Each of these management functions is described in more detail hereinafter.

According to one embodiment of the invention, manager 210 is configured to control switch fabric 208 to provide for the selective exchange of data between wireless devices in any particular sector 102-112 and also between wireless devices in different sectors 102-112. Manager 210 is also configured to perform switching functions to provide for the selective exchange of data between sectors 102-112 and network 212 and between sectors 102-112 and a wireless network connected to wireless backhaul system 214.

According to one embodiment of the invention, manager 210 is also configured to aggregate data from multiple wireless devices in one or more sectors, and cause the aggregated data to be transmitted onto network 212 or the wireless network connected to wireless backhaul system 214. For example, in FIG. 1A, manager 210 is configured to aggregate data from sectors 102-110 and transmit the aggregated data onto network 212 or to wireless network via wireless backhaul system 214. According to one embodiment of the invention, manager 210 transmits the aggregated data onto network 212 or to wireless network via wireless backhaul system 214 via one or more ports. As described in more detail hereinafter, manager 210 is also configured to manage the communications channels used to communicate with wireless devices and to manage the transmit power and receive sensitivities of each sector 102-112.

According to one embodiment of the invention, manager 210 is also configured to maintain configuration data that defines the configuration and operation of apparatus 100. The configuration data may be stored on a volatile storage, such as a RAM, or a non-volatile storage, such as one or more disks or in a database, depending upon the requirements of a particular application. The configuration data may specify, for example, the configuration of the overall system and each sector, information about each wireless device, such as identification and device type information as well as the sector location of each wireless device. The configuration data may also specify a current set of selected communications channels, the particular communications channels to be used in each sector and by each wireless device and the particular frequency bands and communications protocols to be used in each sector and/or by each wireless device. As another example, the configuration data may specify a transmit power level and receive sensitivity for each sector. Manager 210 is also configured to update the configuration information in response to various events.

According to one embodiment of the invention, manager 210 is configured to manage the movement of wireless devices between sectors. This may include, for example, re-assigning communications channels and time slots and updating other information relating to the wireless devices that moved. Suppose that a particular wireless device moves from sector 102 to sector 104. In this situation, manager 210 may assign a new communications channel to the particular wireless device, for example if the current communications channel of the particular wireless device is not being used in sector 104. Manager 210 then updates the configuration information to reflect that the particular wireless device is now located in sector 104 and that communications with the particular wireless device are now to be made using the new assigned communications channel.

Antenna system 202, RF and bandpass filter network 204, WLAN NIC network 206, switch fabric 208, manager 210, network 212 and wireless backhaul system 214 are communicatively coupled by links 216, 218, 220, 222 and 224, as depicted in FIG. 2. Links 216-224 may be implemented by any medium or mechanism that provides for the exchange of data between these elements. Examples of links 216-224 include, without limitation, a network such as a Local Area Network (LAN), Wide Area Network (WAN), Ethernet or the Internet, or one or more terrestrial, satellite or wireless links. A link 226 provides for the exchange of control signals between manager 210 and antenna system 202, RF and bandpass filter network 204, WLAN NIC Network 206 and switch fabric 208.

FIG. 3A is a block diagram that depicts a wireless communications architecture 300 configured in accordance with another embodiment of the invention. Architecture 300 includes antenna elements, examples of these elements may be dipoles, patch elements 302 or other antenna systems, 304 that are configured to transmit on two different frequency bands. Antenna element 302 is coupled to a bandpass filter (BPF) 306 that is coupled to a wireless chipset 308. Antenna element 304 is coupled to a BPF 310 that is coupled to a wireless chipset 312. BPFs 306,310 are controllable by BPF control inputs from a control apparatus, such as management processor and switch fabric 208. Wireless chipsets 308, 312 convert RF signals into digital signals that are provided on digital data outputs. The digital signals may be provided in the form of data packets that are provided to and switched by management processor and switch fabric 208.

FIG. 3B is a block diagram that depicts a wireless communications architecture 350 configured in accordance with another embodiment of the invention. In architecture 350, a dual frequency or ultra wideband antenna element 352 is coupled to a power divider 354. Power divider 354 is coupled to a BPF 356 that is coupled to a wireless chipset 358. Power divider 354 is also coupled to a BPF 360 that is coupled to a wireless chipset 362. As in FIG. 3A, BPFs 356, 360 are controllable by BPF control inputs from a control apparatus, such as manager 210. Also, wireless chipsets 358, 362 convert RF signals into digital signals that are provided on digital data outputs. The digital signals may be provided in the form of data packets that are provided to and switched by manager 210.

Although depicted in FIGS. 3A and 3B as discrete components, BPFs 306, 310 and 356, 360 and wireless chipsets 308, 312 and 358, 362 may be integrated into a single component. Also, BPFs 306, 310, 356, 360 may not be used in some applications, at the expense of performance.

IV. COMMUNICATIONS CHANNELS, PROTOCOLS AND MULTIPLE ACCESS SCHEMES

Any type of communications channel allocation scheme may be used with the wireless communications architecture described herein. The allocation of communications channels to sectors 102-112 may vary depending upon the requirements of a particular implementation and the invention is not limited to any particular channel allocation scheme. Manager 210 is configured to manage the communications channels used to communicate with wireless devices. This may include, for example, determining initial communications channels to be used by wireless devices which may be based on isolation, interference or any other factor affecting performance, assigning communications channels and timeslots to wireless devices and selecting communications protocols. This may also include periodically checking the performance of selected communications channels and dynamically changing the communications channels used by wireless devices. This may include selecting a set of communications channels to be used in each sector based upon communications channel performance.

As described in more detail hereinafter, apparatus 100 may be configured to support multiple frequency bands operating simultaneously. Different frequency bands may be used in different sectors, or even in the same sector. For example, apparatus 100 may be configured with antenna elements and associated electronics to support communications on both the 2.4 Ghz and 5 Ghz frequency bands. Apparatus 100 may also be configured to support any type and number of communications protocols. Example protocols supported by apparatus 100 include, without limitations, the IEEE 802.11(x) wireless communications standards, such as 802.11(a), (b), (g), 802.15(x), 802.16(x) and 802.20(x) c wireless communications standards, and other future wireless communications standards.

Apparatus 100 may also be configured to support any type and number of multiple access schemes to support communications with multiple wireless devices. For example, a Carrier Sense Multiple Access (CSMA), carrier detect or energy detect scheme may be employed to allow multiple wireless devices to communicate using a specified set of communications channels. The wireless devices then communicate on the allocated set of channels using a multiple access scheme such as FDMA or TDMA.

V. INTERFERENCE MITIGATION AND POWER CONTROL

Wireless communications apparatus 100 may be configured to reduce the amount of interference between wireless devices in different sectors 102-112. It is extremely difficult, if not impossible, to completely eliminate all interference between sectors because of the presence of main and side lobes. The general goal, therefore, is to reduce the amount of interference between sectors to below a specified level to provide reliable performance and an acceptable level of quality of service. For example, according to one embodiment of the invention, various techniques are employed to reduce the magnitude of side lobes generated by each sector to reduce the likelihood that transmissions from one sector will trigger a carrier or energy detection algorithm of another sector. Reducing the amount of interference between sectors may also allow the same communications channels to be re-used, i.e., used simultaneously in more than one sector. This greatly increases the number of wireless devices that can be supported by apparatus 100 given a limited amount of available frequency spectrum.

Configuring apparatus 100 to reduce interference between wireless devices in different sectors may take many forms. For example, as described hereinafter in more detail, one or more antenna elements may be physically configured to reduce interference between wireless devices in different sectors. This may include selecting materials and physically constructing antenna elements in a manner to reduce interference between sectors. Also, the polarization of one or more antenna elements may be changed to reduce the amount of interference between wireless devices in different sectors. For example, the polarization orientation of adjacent sectors 102-112 may be varied to reduce interference between wireless devices operating in adjacent sectors 102-112. For example, an antenna element that provides communications with wireless devices in sector 102 may have a first polarization orientation. An antenna element that provides communications with wireless devices in sector 104 may have a second polarization orientation, that is oriented at some angle to the first. In one embodiment, this may be ninety degrees with respect to the antenna element for sector 102.

According to one embodiment of the invention, communications channels are selected to reduce interference between sectors and to provide a specified level of quality of service. For example, the IEEE 802.11(b) communications standard specifies communications on eleven communications channels, of which three (channels 1, 6, 11) are non-overlapping. Thus, in one embodiment employing a three-sector configuration, manager 210 may specify that communication channels 1, 6 and 11 are to be used for the three sectors to reduce the amount of interference and provide more favorable quality of service. In situations where a communications protocol is employed that does not include non-overlapping channels, a testing scheme may be used to identify a suitable assignment of communications channels to achieve specified interference and quality of service levels. This may include initial test to identify a set of initial communications channels to be assigned to the sectors, as well as subsequent periodic testing to provide an updated set of communications channels.

According to one embodiment of the invention, transmit power levels and receive sensitivities are selected to improve communications and reduce interference between sectors. Transmit power levels and receive sensitivities may be selected on a per sector, per wireless device, or even per packet basis, depending upon the requirements of a particular implementation. Varying the transmit power level generally changes the size of a transmission area. For example, in FIG. 1G, the transmit power levels of apparatus 100 are selected to cause sector 102 to have a radius of R1 and sector 104 to have a radius of R2. In this example, the wireless devices in sector 104 are located relatively closer to apparatus 100 than the wireless devices in sector 102. Thus, less power needs to be used with the antenna element associated with sector 104, relative to the antenna element associated with sector 102.

Selectively adjusting the transmit power for each sector serviced by apparatus 100 reduces the overall power consumed by apparatus 100, reduces the possible interference between sectors 102 and 104, and improves security. Varying the receive sensitivity for a particular sector changes the general sensitivity to the particular sector to transmissions from other sectors and other types of interference. According to one embodiment of the invention, the receive sensitivity for a sector is optimized to provide a specified quality of service for wireless devices in the sector, while reducing the likelihood of interference. The transmit power level and receive sensitivities may be adjusted together to optimize sector performance.

Transmit power levels and receive sensitivities may be dynamically adjusted over time to compensate for changing conditions. This may include, for example, changes in the configuration of apparatus 100, changes in the locations and numbers of wireless devices, changes in the frequency band or channels being used, changing power or quality of service requirements and changes in interference sources.

VI. ANTENNA CONFIGURATIONS

Various antenna configurations may be employed with the wireless communications architecture described herein, depending upon the requirements of a particular application. FIG. 4A is a block diagram that depicts a top view of an antenna apparatus 400 used with antenna system 202. Antenna apparatus 400 includes various antenna elements configured to provide wireless communications with wireless devices located in sectors 402-412. Specifically, antenna apparatus 400 includes a center reflector portion 414. With respect to sector 402, antenna apparatus 400 includes a radiating assembly 416 configured to radiate electromagnetic energy into sector 402. Antenna apparatus 400 also includes metal septums 418, 420 that are configured to define sector 402. Metal septums 418, 420 may be separated from center reflector portion 414, as indicated by apertures 422, 424, to reduce coupling between sector 402 and the other sectors 404-412. According to one embodiment of the invention, septums 418, 420 are positioned from center reflector portion 414 at a distance that is proportional to the transmission wavelength. Antenna apparatus 400 also includes RF chokes 426, 428, coupled to the ends of metal septums 418, 420.

Antenna apparatus 400 may also includes radio frequency absorptive material, such as foam or other material or photonic bandgap structures, disposed between the metal septums and the top and bottom of antenna apparatus 400 to further reduce coupling between sectors. For example, FIG. 4B is a side view of antenna apparatus 400 depicting the various components of FIG. 4A. As depicted in FIG. 4B, radio frequency absorptive material 430 is disposed on top and bottom of septums 418, 420 to reduce electromagnetic coupling between sectors 402-412.

Although antenna apparatus 400 has been described in the context of sector 402, antenna apparatus 400 includes similar antenna elements for the other sectors 404-412. The dimensions and characteristics of the other antenna elements that provide wireless communications for sectors 404-412 may be the same as or different from the aforementioned antenna elements that provide wireless communications for sector 402.

FIG. 5A is a block diagram of an end view of a radiating assembly 500 configured in accordance with an embodiment of the invention. Radiating assembly 500 may be used for radiating assembly 416 in antenna apparatus 400. Radiating assembly 500 includes a base 502 and patch elements 504, 506 attached thereto. Patch elements 504, 506 may be built upon a PCB such as FR4, or other dielectric substrate. Although radiating assembly 500 is configured with two patch elements 504, 506, radiating assembly 500 may be configured with a single patch element, depending upon the requirements of a particular implementation. Patch elements 504, 506 are oriented with respect to each other at an angle B, as depicted in FIG. 5A, to introduce polarization diversity. According to one embodiment of the invention, patch elements 504, 506 are oriented at approximately ninety degrees with respect to each other, although other angles may be used, depending upon the requirements of a particular application. Radiating assembly 500 may also be oriented with respect to other radiating assemblies in an antenna apparatus to decrease polarization alignment and provide greater isolation between sectors. For example, radiating assembly 416 for sector 402 may be oriented with respect to the radiating assemblies for sectors 404-412 to decrease polarization alignment and provide greater isolation between sectors 402 and 404-412.

FIG. 5B is a block diagram that depicts patch element 504 configured according to one embodiment of the invention. In this embodiment, patch element 504 is duel frequency and includes a radiating element 508. Radiating element 508 is generally "T" shaped and includes a long microstrip 510 for low frequency operation and a short microstrip 512 for high frequency operation. Two microstrips 510, 512 are not required by the invention, and some implementations may have only a single microstrip where communications in only single frequency band are required. As an alternative to using the "T" shaped radiating element 508 in dual-band applications, two separate patch elements may be used, where one of the patch elements is a small patch element that includes a low frequency microstrip and the other larger patch element includes a high frequency microstrip. In this situation, the smaller high frequency patch element may be suspended above the larger lower frequency patch element.

VII. LOGICAL SECTORING

Figure 6:
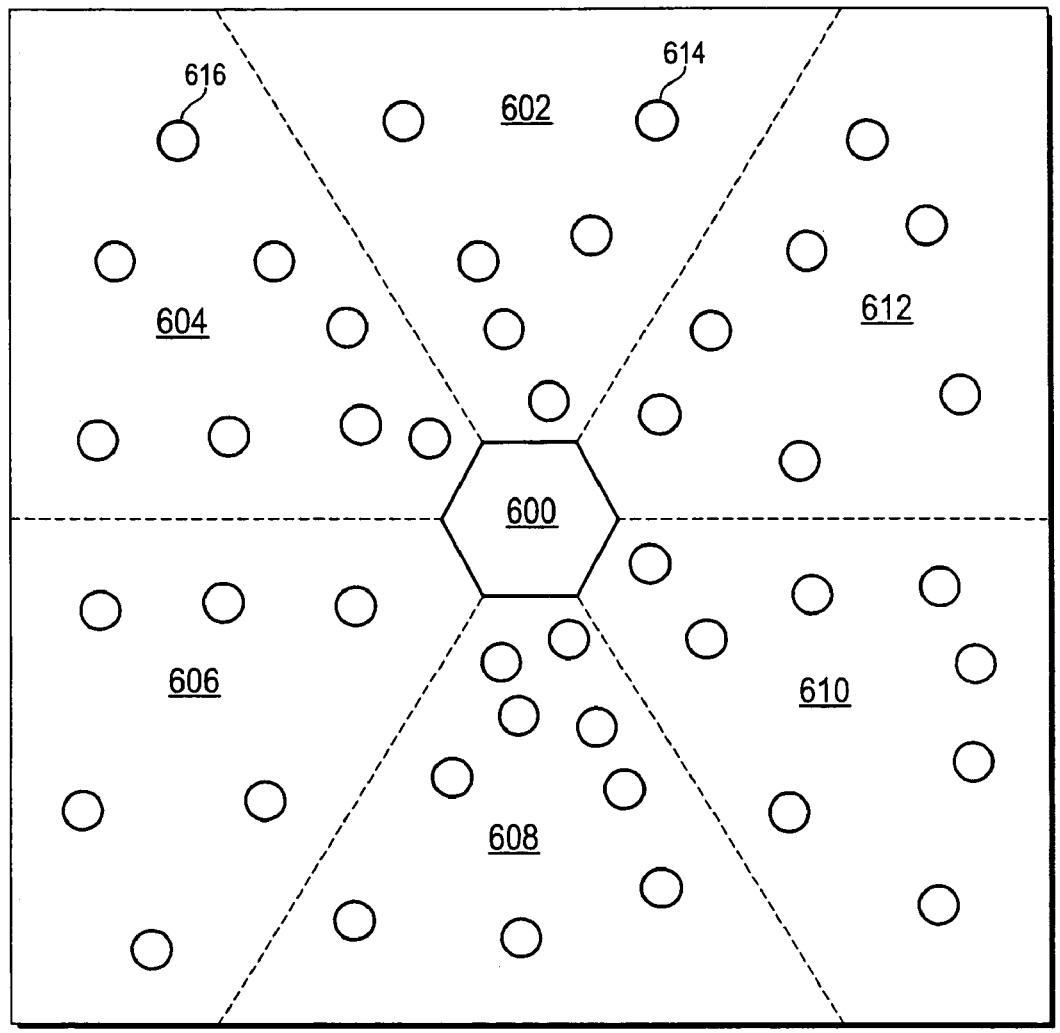
FIG. 6 is a block diagram illustrating an area being spatially segmented in an embodiment of the invention.

FIG. 6 is a block diagram illustrating an area being spatially segmented in an embodiment of the present invention. Embodiments employing segmentation can increase the aggregate throughput of a network. As shown in FIG. 6, an area 601 is segmented into six distinct regions having approximately equal area. Although area 601 is segmented into approximately equal areas in the embodiment illustrated in FIG. 6, equal area sectors are not required. In one embodiment, a radius and an angle formed by the intersection of sector boundaries of each sector may be varied to balance the number of users in each sector. In one embodiment, the invention provides the capability to select a frequency and a polarization for each unique sector in area 601. In an embodiment, device 614 in sector 602 and device 616 in sector 604 are able to transmit or receive substantially concurrently on the same frequency or on different frequencies.

FIG. 7 is a block diagram illustrating modes of operation of an example wireless communications apparatus in an embodiment of the present invention. As shown in FIG. 7, apparatus 700 can be configured to operate in a range mode configuration 701(*a*) and a capacity mode configuration 701(*b*). In range mode configuration 701(*a*), device 700 uses three channels having the highest isolation to provide wireless connectivity to devices in six physical sectors, 702(*a*), 704(*a*), 706(*a*), 708(*a*), 710(*a*) and 712(*a*). While illustrated generally using three channels in FIG. 7, device 700 is not limited to three channels and a larger or smaller number of channels may be utilized in other embodiments. In range mode (e.g., configuration 701(*a*)), a specified maximal amount of power allowed by the applicable wireless communications standard is used for each wireless transmitter. Accordingly, a frequency allocation providing high channel rejection and isolation between channels is selected to enable device 700 to be operated at this power setting. For example, in configuration 701(*a*), device 700 has allocated non-overlapping channels 11, 1 and 6 as follows: channel 11 to sector 702(*a*) and sector 704(*a*), channel 1 to sector 706(*a*) and sector 708(*a*), channel 6 to sector 710(*a*) and sector 712(*a*). Other channel allocations may be used in various embodiments. In one embodiment, since channels on the same frequency use a carrier sense, carrier detect or energy detect algorithm for determining channel access, channels on the same frequency are able to share bandwidth even though the channels are used in adjacent sectors. For example, sector 702(*a*) and sector 704(*a*) are able to share channel 11 even though these sectors are adjacent because devices using this channel will use a carrier sense, carrier detect or energy detect algorithm for determining channel availability prior to accessing the channel.

In capacity mode configuration 701(*b*), device 700 uses a relatively greater number of channels to provide wireless connectivity with increased available bandwidth. In one embodiment, in capacity mode, each sector is operated using a different channel, if available. As depicted by FIG. 7, each sector in capacity mode configuration 701(*b*) is allocated a unique frequency/channel. For example, in configuration 701(*b*), device 700 has allocated channel 5 to sector 702(*b*), channel 11 to sector 704(*b*), channel 1 to sector 706(*b*), channel 7 to sector 708(*b*), channel 3 to sector 710(*b*) and channel 9 to sector 712(*b*). Other channel allocations may be used in various embodiments. The device 700 allocates channels to sectors to reduce the interference between sectors.

Figure 8:
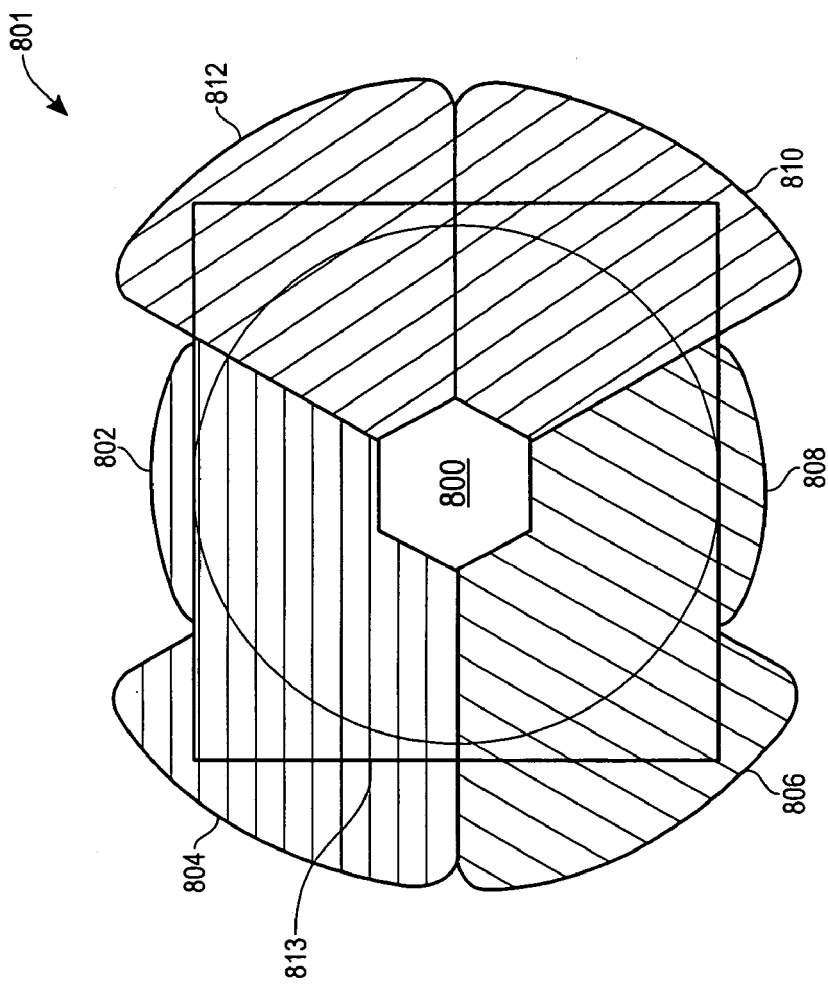
FIG. 8 is a block diagram illustrating range modes of an example device in an embodiment of the invention.

FIG. 8 is a block diagram illustrating an example device operating in a range mode in an embodiment of the present invention. As depicted by FIG. 8, a wireless communications transmitter device 800 operating in a range mode uses three channels to provide wireless connectivity to devices located in three logical sectors, including a first logical sector comprised of physical sectors 802 and 804, a second logical sector comprised of physical sectors 806 and 808 and a third logical sector comprised of physical sectors 810 and 812. Device 800 selects three channels with the highest isolation among one other for use in the three virtual sectors. While this embodiment is discussed generally with reference to the illustrated example using three channels, a larger or smaller number of channels can be used in other embodiments.

In the example illustrated by FIG. 8, the physical sectors operating on the same channel to comprise a logical sector are not required to have the same radius. For example, physical sectors 802 and 804, which comprise the first logical sector, are of a different radius. In the embodiment of FIG. 8, the size and radius of any particular sector may be tailored to fit a particular geographic area or any room for indoor applications. In one embodiment, the radius is governed by the transmit power of the sector and the receive sensitivity set to that sector. The capability to alter radius of a sector enables device 800 to provide wireless communications coverage to devices in areas of varying shapes and sizes, such as indicated by room outline 813 in FIG. 8.

In the example illustrated by FIG. 8, logical sectors comprise a number of physical sectors operating on the same channel are adjacent to each other. For example, sector 802 and sector 804 share the same frequency and are adjacent to one another. Adjacency is not required to form a logical sector, however, by embodiments that provide logical sectors comprised of non-adjacent physical sectors. The device 800 automatically determines which channels are to be allocated to which sectors to reduce the interference between sectors, avoid rogue access points and to increase network throughput. As used herein, the term "Rogue access points" is used to refer to access points that are not installed or authorized by the system administrator. Such access points are non-authorized access points installed by the users or someone else. The channel allocation, power and radius may be software controlled and changed dynamically based on network conditions. By selecting channels having a high channel rejection and isolation between channels, the device 800 can be operated in range mode. Range mode enables device 800 to provide wireless communications access to devices at a greater distance from device 800. Furthermore, device 800 employs a carrier sense, carrier detect or energy detect algorithm for determining channel access on sectors operating on the same frequency.

Figure 9:
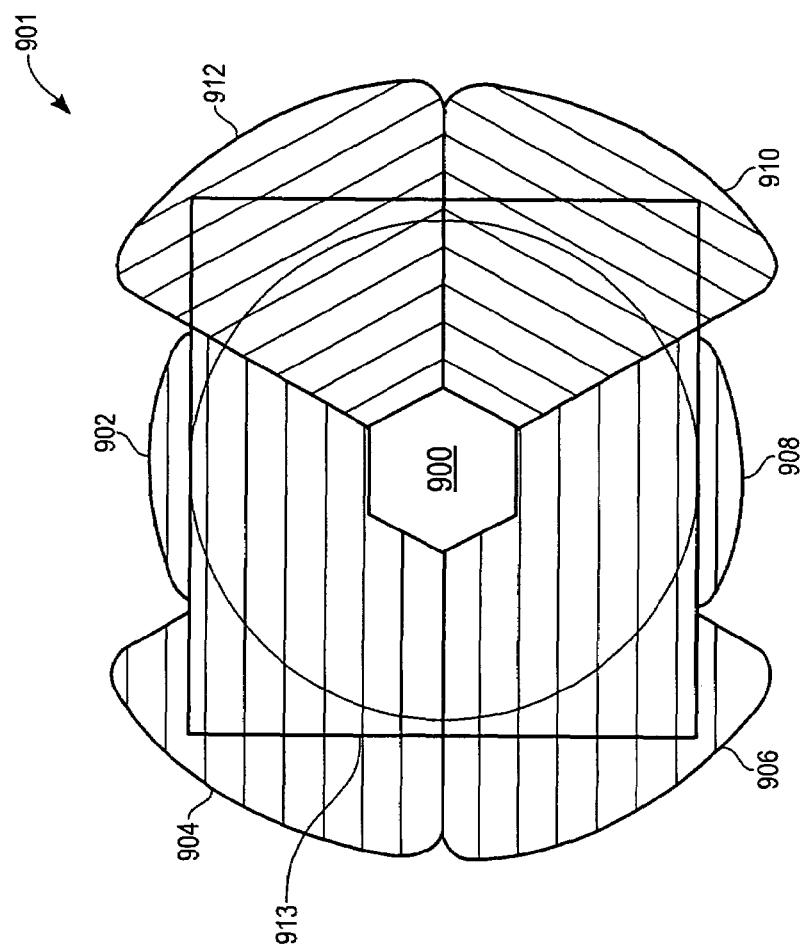
FIG. 9 is a block diagram illustrating range modes of an example device in an embodiment of the invention.

FIG. 9 is a block diagram illustrating an example device operating in range mode in an embodiment of the present invention. As depicted by FIG. 9, device 900 is configured to provide wireless communications to three logical sectors using three channels, in which the logical sectors are configured to be of unequal angles. For example, in one configuration illustrated by FIG. 9, device 900 has configured a first logical sector comprised of physical sectors 902, 904, 906 and 908, a second logical sector comprised of physical sector 910 and a third logical sector comprised of physical sector 912. In one embodiment, a system administrator can manually change the angle, and therefore the width, of the sectors based on the number of users in a particular sector. In one embodiment, the device 900 can automatically change the width of the sectors based on the number of users in a particular sector. In one embodiment, if a sector has more than a specified number of users in a particular sector, the device 900 changes the size of the sector to balance the number of users in the sectors. Accordingly, device 900 determines the size of the sectors. The device 900 automatically determines which channels are to be allocated to which sectors to reduce the interference between sectors, avoid rogue access points and to increase network throughput. In one embodiment, channel allocation, power and radius may be changed dynamically under software control based on network conditions.

In the example configuration depicted by FIG. 9, three channels having the highest isolation with respect to one another are allocated to the three logical sectors, however, a larger or smaller number of channels can be configured in the illustrated and other embodiments. By selecting channels having a high channel rejection and isolation between channels, the device 900 can be operated in range mode. Range mode enables device 900 to provide wireless communications access to devices at a greater distance from device 900.

FIG. 9 further illustrates that in an embodiment, sectors operating on the same channel are not required to have the same radius. The radius is governed by the transmit power of the sector and the receive sensitivity set to that sector. In one embodiment, the size and radius of any particular sector may be tailored to fit a particular spatial area, such as within the perimeter 913 of a building, for example.

In the example configuration depicted by FIG. 9, sectors operating on the same channel are adjacent to each other, however adjacency is not required in other embodiments. Furthermore, device 900 employs a carrier sense, carrier detect or energy detect algorithm for determining channel access on sectors operating on the same frequency.

Figure 10:
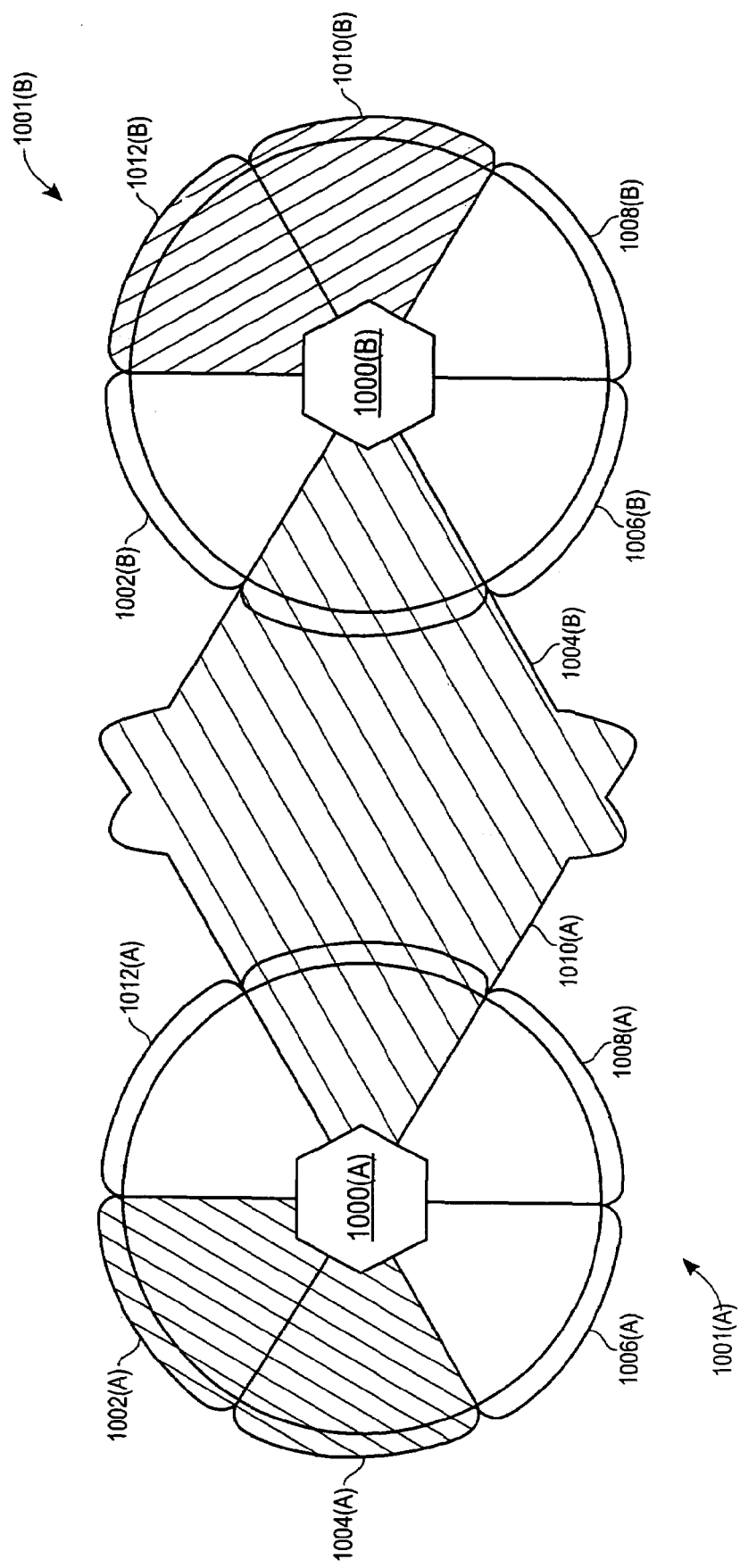
FIG. 10 is a block diagram illustrating range modes of an example device in an embodiment of the invention.

FIG. 10 is a block diagram illustrating an example device operating a wireless backhaul with another device in an embodiment of the present invention. As depicted by FIG. 10, device 1001(a) has the capability to use a sector to form a wireless backhaul using a high throughput radio link established between the sector and a sector of a second device 1001(b). In one embodiment, the device 1001(a) establishes the wireless backhaul by sequentially searches each sector until it finds a sector 1010(a) capable of communicating with another sector 1004(b) from another device 1001(b) suitable for forming a high-speed wireless connection.

In the example embodiment illustrated by FIG. 10, device 1001(a) operates in a range mode, using three channels with the highest isolation among one another; however, a larger or smaller number of channels can be used in other embodiments. Furthermore this example illustrates that the sectors do not need to be equal angle and change based on the number of users in a particular sector. In one embodiment, if a sector has more than a specified number of users, the device 1001(a) may change the size of the sector in order to balance the number of users.

Figure 11A:
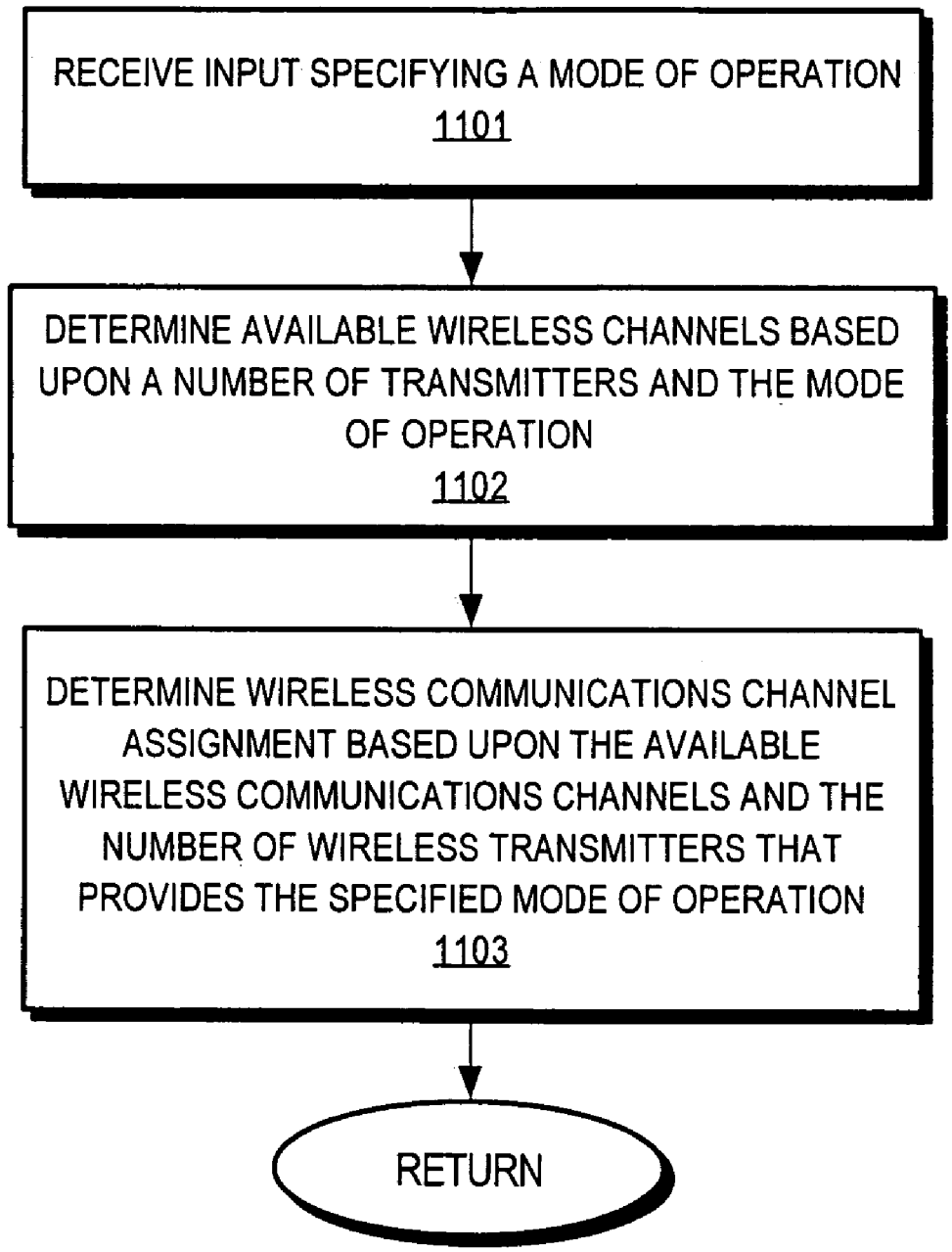

FIGS. 11A-11F are operational flow diagrams illustrating the operation of one embodiment of the present invention. With reference to FIG. 11A, in block 1101, input specifying a mode of operation is received. In block 1102, available wireless communications channels are determined based upon the number of transmitters and the mode of operation. In block 1103, a wireless communications channel assignment that provides the specified mode of operation is determined based upon the available wireless communications channels and the number of wireless transmitters.

Figure 11B:
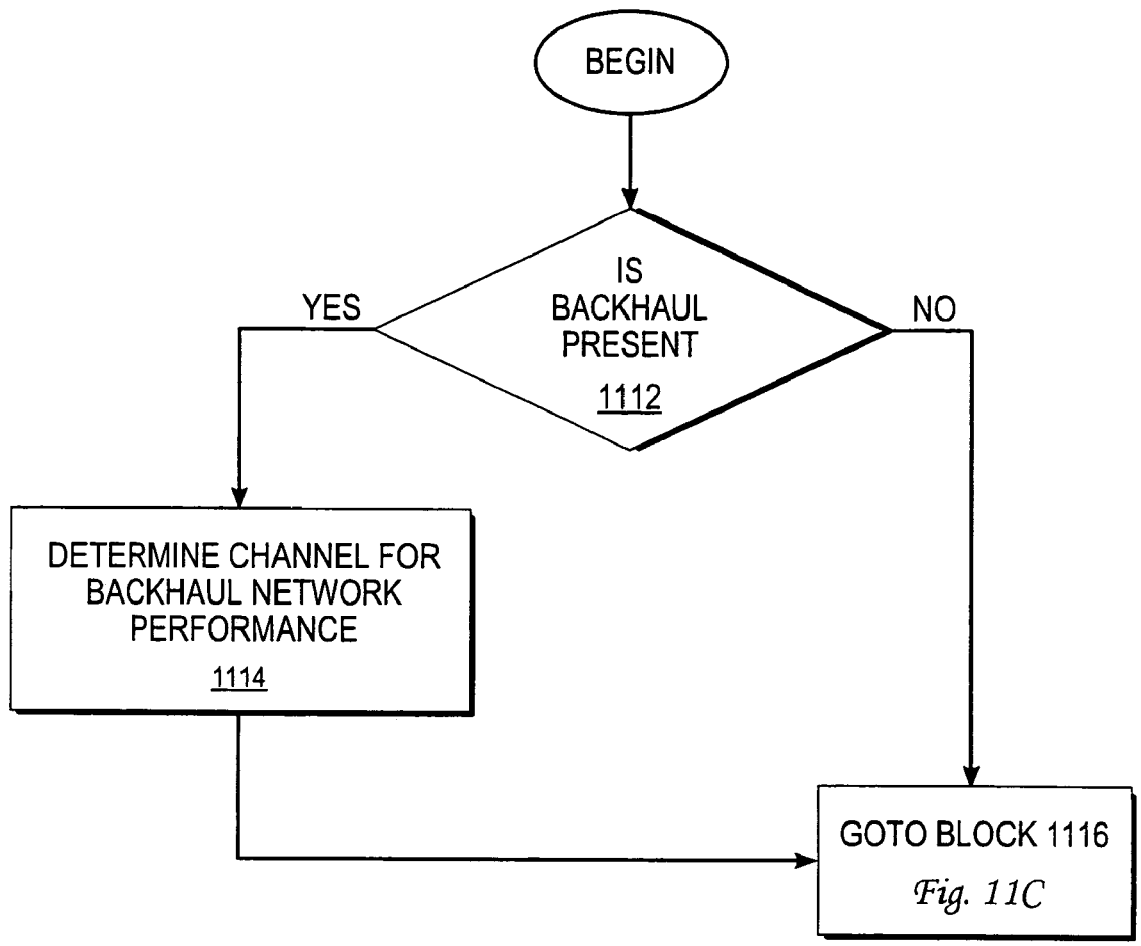

With reference to FIG. 11B, processing for determining whether available wireless channel(s) are to be allocated to a wireless backhaul is illustrated with reference to one example embodiment. In block 1112, a test is performed to determine whether a wireless backhaul is present. If a wireless backhaul is present, then in block 1114, a channel selection for providing backhaul network performance is determined. Otherwise, or in any event, channel selection processing continues at block 1116 of FIG. 11C.

Figure 11C:
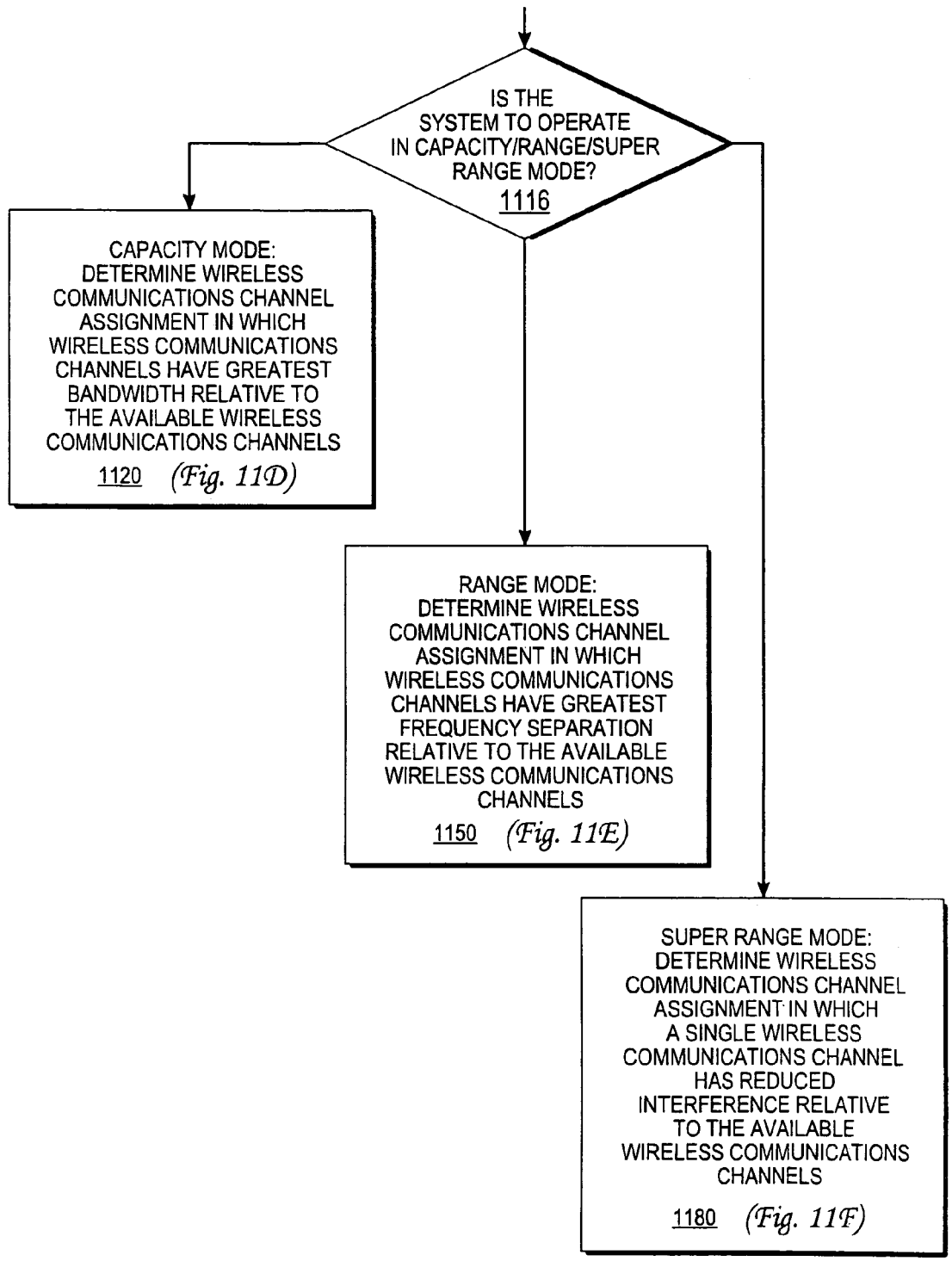

With reference to FIG. 11C processing for determining available wireless channels and assigning the wireless communications channels based upon the number of transmitters and the mode of operation is illustrated with reference to one example embodiment. In block 1116, the specified mode of operation is tested to determine if a mode indicating a mode indicating greater throughput ("capacity mode"), a greater range of coverage ("range mode") or a greatest achievable range ("super range mode") has been selected. If the mode indicates capacity mode, then in block 1120, a wireless communications channel assignment in which the selected wireless communications channels have a greatest bandwidth relative to available wireless communications channels is determined. If the mode indicates range mode, then in block 1150, a wireless communications channel assignment in which wireless communications channels have greatest frequency separation relative to the available wireless communications channels is determined. If the mode indicates super range mode, then in block 1180, a wireless communications channel assignment in which a single wireless communications channel having a minimal interference relative to the available wireless communications channels is determined.

With reference to FIG. 11D, processing for determining wireless communications channel assignment in a capacity mode, i.e., a mode in which the selected wireless communications channels have a greatest bandwidth relative to available wireless communications channels, is illustrated with reference to one example embodiment. In block 1121, a wireless communications device listens in each sector in order to determine external interference present in the sector. In block 1122, a list of non-allowable channels for each sector is produced. In block 1123, a test is made to determine whether there are more available non-overlapping wireless communications channels than sectors. If there are more available non-overlapping wireless communications channels than sectors, then in block 1124, a channel set length, M (i.e., number of channels intended to be used), is set equal to the number of sectors. In block 1125, all channel sets, S, of length M are determined. In block 1126, performance of each channel set in S is determined. Performance in one embodiment may be a predicted network throughput. In 802.11, for example, every access point or other interferer on a channel is divided into the throughput to determine a predicted network throughput. Thus, the predicted network throughput for the access point is the throughput divided by the number of interferers on the channels used by the access point. For example, if the total throughput is 11 Mbps and 10 interferers are present, then the predicted performance is stated as: 11/10 provided that all stations are connected to the access point at a data rate of 11 Mbps. The rate decreases according to the maximum throughput divided by the sum of max_rate divided by the connected rate multiplied by the number of users connected at that rate, as indicated by the following formula:

$$\text{Average\_throughput} = \frac{\text{max\_rate}}{\sum_{i=0}^{x} \frac{\text{max\_rate}}{\text{rate}_i} n_i}$$

In block 1127, the channel sets S are ordered based upon performance. In block 1128, a test is made to determine whether there exists a channel set in S that meets network performance criteria. If a channel set in S meets the network performance criteria, then processing completes. Otherwise, there are insufficient allowable non-overlapping channels to meet the number of sectors; so overlapping channels need to be used. In one embodiment, possible sets of overlapping channels will be tested using a performance criteria until either one that meets the network performance criteria is found, or alternatively, a "best available" channel set is determined. Accordingly, processing continues with block 1129, in which the channel set length, M, is set equal to the number of sectors. In block 1130, all channel sets, S, of length M are determined. In block 1131, a test is made to determine whether there exists a channel set in S that meets network performance criteria. If a channel set in S meets the network performance criteria, then processing completes. Otherwise, processing continues with block 1132, in which the best-performing channel set is stored if its performance is better than a previously stored best-performing channel set. In block 1134, a test is made to determine whether M is greater than one. If M is not greater than one, then in block 1135, the best-performing channel set so far is returned as a result, and processing completes. Otherwise, processing continues with block 1136, in which M is decremented and control is passed back to block 1130 to again determine all channel sets S having a length equal to the new value of M. The foregoing process successively tests smaller sets of independent channels to find a channel set that either meets the network performance criteria or alternatively a "best available" network capacity in one embodiment. While a greater number of non-overlapping channels typically provides a higher capacity, in certain applications the presence of more channels may not provide the greatest relative capacity because greater interference may be present between the channels. Thus, there may be a channel fit in which the same channel is used on multiple sectors, which provides an overall increased network throughput. Embodiments can employ the foregoing processing to determine alternative channel selections that employ shared or overlapping channels, which provide greater capacity in the presence of interference. Channels used more than once may be spaced farther apart in different sectors or allocated to lower priority sectors, for example, to reduce interference.

With reference to FIG. 11E, processing for determining a wireless communications channel assignment in a range mode, i.e., a mode in which wireless communications channels have greatest frequency separation, relative to the available wireless communications channels, is illustrated with reference to one example embodiment. In block 1151, a wireless communications device listens in each sector in order to determine external interference or occupied channels present in the sector. In block 1152, a list L1 of non-desirable channel assignments for each sector is produced. In one embodiment, any channel assignment in which an interferer, whether an internally generated interference or an interference from an external source such as a neighboring wireless access point for example, is present on that channel is a candidate for inclusion in list L1. In block 1153, a test is made to determine whether there are more available non-overlapping wireless communications channels than sectors that meet specific power constraints. In one embodiment, the power constraints are regulatory. In one embodiment, power regulatory constraint is specified as an Equivalent Isotropically Radiated Power (EIRP). If there are more available non-overlapping wireless communications channels than sectors that meet the EIRP constraints, then in block 1154, a channel set length, M, is set equal to the number of sectors. In block 1155, all channel sets, S, of length M are determined. In block 1156, performance of each channel set in S is determined. In block 1157, the channel sets in S are ordered based upon performance. In block 1158, a test is made to determine whether there exists a channel set in S that meets network performance criteria. If a channel set in S meets the network performance criteria, then processing completes. Otherwise, there are insufficient non-overlapping channels. So a channel set providing reduced interference and increased range is searched. Accordingly, processing continues with block 1159, in which the channel set length, M, is set equal to the number of non-overlapping channels that meet the EIRP constraint. In block 1160, a list L2 of all channel sets, S, of length M non-overlapping channels that meet the EIRP constraint is determined. In block 1161, a list L3 of all mappings of channels to sectors is determined. List L3 may be formed by determining the channels in L2 that do not interfere with channels in list L1. In list L3, a channel may be used in more than one sector. In block 1162, the list L3 is ordered based upon the number of sources of interference present in the sector or collisions with other applications present in list L1. In block 1163, performance of each mapping in list L3 is determined. In block 1164, the mappings in list L3 are ordered based upon performance. In one embodiment, the ordering is according to the performance score of the mappings of list L3.

In block 1165, a test is made to determine whether there exists a mapping in list L3 that meets network performance criteria. If a mapping in list L3 meets the network performance criteria, then processing completes. Otherwise, a smaller number of channels are tried. Accordingly, processing continues with block 1166, in which the best-performing channel set and channel to sector mapping is stored if its performance is better than a previously stored best-performing channel set and channel to sector mapping. In block 1167, a test is made to determine whether M is greater than one. If M is not greater than one, then in block 1168, the best-performing channel set and channel to sector mapping so far is returned as a result, and processing completes. Otherwise, processing continues with block 1169, in which M is decremented and control is passed back to block 1160 to again determine all non-overlapping channel sets S having a length equal to the new value of M that meet the power constraint. The foregoing channel selection process successively tests smaller sets of independent channels to find a channel set that either meets the network performance criteria or alternatively a "best available" network capacity in one embodiment. In embodiments employing range mode, a switch-beamed system is provided, in which different sectors may use the same frequency but only one sector is operating at a time. Antenna gain enables communications at a greater distance and with greater selectivity, so that a wireless communications device that is enabled to listen in any one sector at a time will not experience diminished performance by an interferer if an interferer is present in a sector other than the one being communicated with because of the selectivity of the antenna radiation pattern.

Figure 11F:
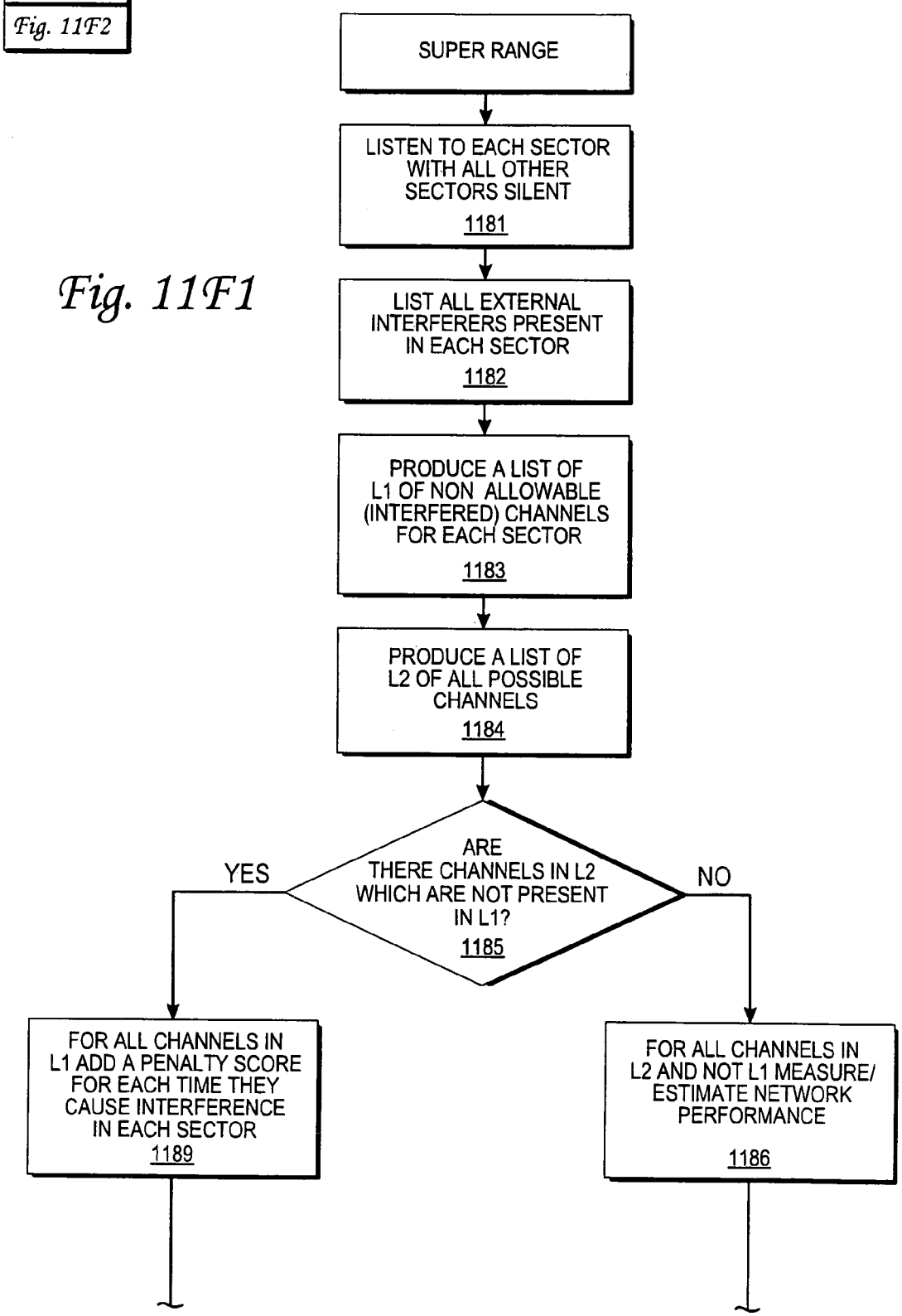

With reference to FIG. 11F, processing for determining a wireless communications channel assignment in a super range mode, i.e., a mode in which a single wireless communications channel is selected to operate on all sectors in order to provide greater range, is illustrated with reference to one example embodiment. In block 1181, a wireless communications device listens in each sector with all other sectors silent. In block 1182, a list of sources of external interference present in each sector is determined. In block 1183, a list L1 of non-allowable channels in each sector is produced. In block 1184, a list L2 of all possible channels, i.e., channels that meet power constraints that are not present in list L1 is produced. In block 1185, a test is made to determine whether there are channels in list L2 that are not present in list L1. If there are channels in list L2 that are not present in list L1, then in block 1186, the performance of each of the channels in list L2 that are not present in list L1 is determined. In block 1187, the channels in list L2 that are not present in list L1 are ordered based upon performance. In block 1188, the channel ranking best is selected and processing is complete.

Otherwise, the test of block 1185 has determined that there are no channels in list L2 that are not present in list L1. Accordingly, the best available channel is selected from the channels in list L1, which are subject to one or more interferers. This processing continues with block 1189, in which a penalty is charged against each channel in list L1 for each time the channel causes an interference to occur in each other sector. In block 1190, the channels in list L1 are sorted based upon the penalty score. In block 1191, performance is determined for each channel in list L1. In block 1192, the channel having the best performance is selected as a result and processing is complete. For example, a channel may be selected from among channels on list L1 based upon, criteria such as whether the interference caused by the selected channel impacts a substantially large number of wireless communications.

VIII. IMPLEMENTATION MECHANISMS, ALTERNATIVES & EXTENSIONS

The wireless communications architecture described herein may be implemented in hardware, software, or any combination of hardware and software. For example, manager 210 may be implemented using a generic computing platform that executes various software programs to perform the functions described herein.

Figure 12:
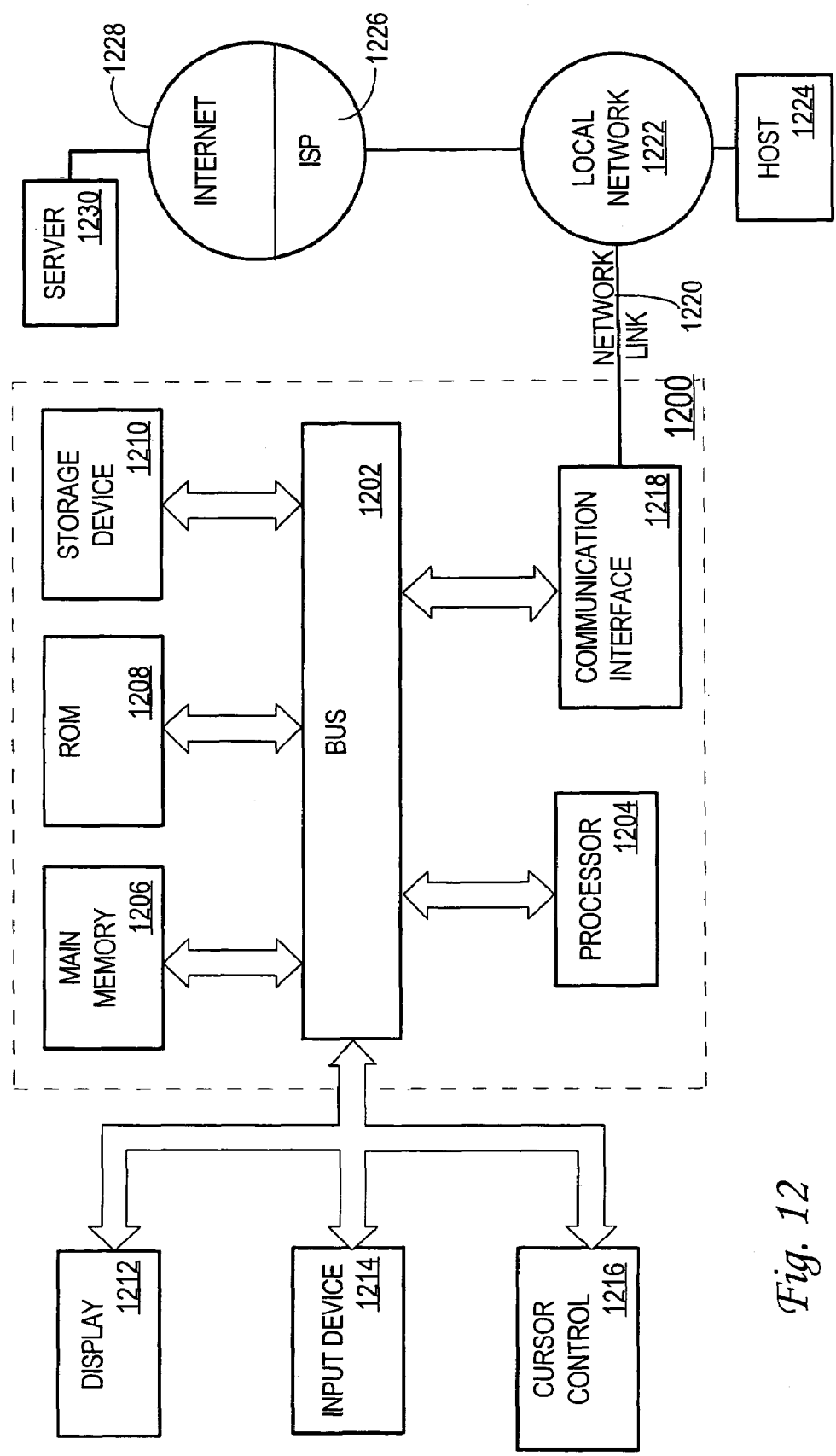
FIG. 12 is a block diagram that depicts a computer system on which embodiments of the invention may be implemented.

FIG. 12 is a block diagram that illustrates an example computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 in a wireless communications architecture. According to one embodiment of the invention, wireless communications are provided by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. One or more processors in a multi-processing arrangement may also be employed to execute the sequences of instructions contained in main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application manages a wireless communications architecture as described herein.

Processor 1204 may execute the code as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining an assignment of wireless communications channels to a plurality of wireless communications transmitters, comprising:
   receiving an input specifying a mode of operation from among a plurality of modes of operation, wherein the mode of operation identifies one or more desired characteristics of a channel-to-transmitter assignment;
   determining a plurality of available wireless communications channels based upon a number of wireless communications transmitters in the plurality of wireless transmitters and the mode of operation;
   determining a wireless communications channel assignment for the plurality of wireless communications transmitters based upon the plurality of available wireless communications channels and the number of wireless communications transmitters in the plurality of wireless transmitters that provides the specified mode of operation.

2. The method as recited in claim 1, wherein the mode of operation provides greater range of coverage relative to other modes of operation and wherein determining the wireless communications channel assignment based upon the plurality of available wireless communications channels and the number of wireless communications transmitters in the plurality of wireless transmitters further comprises:
   determining the wireless communications channel assignment in which the wireless communications channels have a greatest frequency separation relative to the plurality of available wireless communications channels.

3. The method as recited in claim 2, wherein determining the wireless communications channel assignment in which the wireless communications channels have the greatest frequency separation relative to the plurality of available wireless communications channels, further comprises:
   determining the wireless communications channel assignment in which the wireless communications channels do not overlap.

4. The method as recited in claim 1, further comprising:
   assigning the plurality of wireless communications transmitters to a shared wireless communications channel; and
   wherein the plurality of wireless communications transmitters assigned to the shared wireless communications channel use a multiple access communications protocol to determine availability of the shared wireless channel prior to transmitting on the shared wireless communications channel.

5. The method as recited in claim 4, wherein the multiple access communications protocol comprises at least one of a carrier sense, carrier detect and an energy detect mechanism.

6. The method as recited in claim 1, wherein the mode of operation provides greater throughput relative to other modes of operation and wherein determining the wireless communications channel assignment based upon the plurality of available wireless communications channels and the number of wireless communications transmitters in the plurality of wireless transmitters further comprises:
   determining the wireless communications channel assignment in which the wireless communications channels have a greatest bandwidth relative to the plurality of available wireless communications channels.

7. The method as recited in claim 6, wherein determining the wireless communications channel assignment in which the wireless communications channels have the greatest bandwidth relative to the plurality of available wireless communications channels, further comprises:
   determining the wireless communications channel assignment in which at least two of the wireless communications channels overlap.

8. The method as recited in claim 1, further comprising:
   assigning each one of the plurality of wireless communications transmitters to an individual wireless communications channel, if available, otherwise assigning the plurality of wireless communications transmitters to a shared wireless communications channel; and
   wherein the plurality of wireless communications transmitters assigned to the wireless communications channel use a multiple access communications protocol to determine availability of the wireless channel assigned to the wireless communications transmitter prior to transmitting on the wireless communications channel.

9. The method as recited in claim 8, wherein the multiple access communications protocol comprises at least one of a carrier sense, carrier detect and an energy detect mechanism.

10. The method as recited in claim 1, wherein the mode of operation provides greatest range of coverage relative to other modes of operation and wherein determining the wireless communications channel assignment based upon the plurality of available wireless communications channels and the number of wireless communications transmitters in the plurality of wireless transmitters further comprises:
    determining the wireless communications channel assignment in which a single wireless communications channel has a minimal interference relative to the plurality of available wireless communications channels.

11. The method as recited in claim 1, further comprising: assigning the plurality of wireless communications transmitters to the single wireless communications channel.

12. The method as recited in claim 1, wherein wireless communications channels are selected from a frequency band specified by one of the IEEE 802.11(a), 802.11(b), 802.11(g), 802.15(x), 802.16(x) and 802.20(x) wireless communications standards.

13. The method as recited in claim 1, wherein at least one wireless communications transmitter is assigned a wireless communications channel for establishing a backhaul wireless communications with a wireless backhaul system.

14. A wireless access point, comprising:
an antenna configured to send and receive communications signals on a first wireless communications channel within a first section of a spatial area and to send and receive communications signals on a second wireless communications channel within a second section of the spatial area;
a management mechanism configured to assign the first and second wireless communications channels to the first and second sections of the spatial area in accordance with a channel sector assignment determined from a set of potential channel assignments for available channels that are selected based upon a specified mode of operation from among a plurality of modes of operation; and
wherein the plurality of modes of operation includes (a) a range mode in which the wireless communications channels have a greatest frequency separation relative to available wireless communications channels; and (b) a capacity mode in which the wireless communications channels have a greatest bandwidth relative to available wireless communications channels.

15. The wireless access point as recited in claim 14, wherein the management mechanism is further configured to use a multiple access communications protocol to determine availability of a wireless communications channel prior to transmitting on the wireless communications channel, thereby enabling reduced interference between the first section and the second section of the spatial area.

16. An apparatus for determining an assignment of wireless communications channels to a plurality of wireless communications transmitters, comprising:
means for receiving an input specifying a mode of operation from among a plurality of modes of operation, wherein the mode of operation identifies one or more desired characteristics of a channel-to-transmitter assignment;
means for determining a plurality of available wireless communications channels based upon a number of wireless communications transmitters in the plurality of wireless transmitters and the mode of operation;
means for determining a wireless communications channel assignment for the plurality of wireless communications transmitters based upon the plurality of available wireless communications channels and the number of wireless communications transmitters in the plurality of wireless transmitters that provides the specified mode of operation.

17. A volatile or non-volatile computer readable medium carrying one or more sequences of instructions for determining an assignment of wireless communications channels to a plurality of wireless communications transmitters, which instructions, when executed by one or more processors, cause the one or more processors to carry out the steps of:
receiving an input specifying a mode of operation from among a plurality of modes of operation, wherein the mode of operation identifies one or more desired characteristics of a channel-to-transmitter assignment;
determining a plurality of available wireless communications channels based upon a number of wireless communications transmitters in the plurality of wireless transmitters and the mode of operation;
determining a wireless communications channel assignment for the plurality of wireless communications transmitters based upon the plurality of available wireless communications channels and the number of wireless communications transmitters in the plurality of wireless transmitters that provides the specified mode of operation.

18. A wireless access point, comprising:
an antenna configured to send and receive communications signals on a first wireless communications channel within a first section of a spatial area around the wireless access point and to send and receive communications signals on a second wireless communications channel within a second section of the spatial area around the wireless access point;
a management mechanism configured to assign the first and second communications channel to the first and second sections of the spatial area in accordance with a channel to sector assignment determined from a set of potential channel to sector assignments for available channels; and
wherein a portion of the communications signals are sent and received on a shared wireless communications channel using a multiple access communications protocol to determine availability of the shared wireless channel prior to transmitting on the shared wireless communications channel, thereby enabling wireless communications to be conducted substantially contemporaneously in the first section of the spatial area and the second section of the spatial area using the shared wireless communications channel.

* * * * *

(12) INTER PARTES REEXAMINATION CERTIFICATE (660th)
United States Patent
Skafidas et al.

(10) Number: US 7,555,301 C1
(45) Certificate Issued: *Aug. 12, 2013

(54) METHOD AND APPARATUS FOR COVERAGE AND THROUGHPUT ENHANCEMENT IN A WIRELESS COMMUNICATION SYSTEM

(75) Inventors: Efstratios Skafidas, Coburg (AU); Ben Jones, Austin, TX (US); John (Jack) Morton, Austin, TX (US); Mike Gibson, Austin, TX (US); Neil Patrick Kelly, Austin, TX (US); Nestor Fesas, Austin, TX (US); Mark William Benson, Austin, TX (US); Richard John Rusnak, Austin, TX (US); James Glick, Lexington, TX (US); Duy Khuong Do, Melbourne (AU); Douglas A. Mammosser, Austin, TX (US); Lei Cheng, Austin, TX (US); Kevin Sean Broe, Austin, TX (US); Natarajan Ekambaram, Austin, TX (US)

(73) Assignee: Bandspeed, Inc., Austin, TX (US)

Reexamination Request:
No. 95/001,713, Aug. 16, 2011

Reexamination Certificate for:
Patent No.: 7,555,301
Issued: Jun. 30, 2009
Appl. No.: 11/507,827
Filed: Aug. 21, 2006

(*) Notice: This patent is subject to a terminal disclaimer.

Related U.S. Application Data

(63) Continuation of application No. 10/870,199, filed on Jun. 16, 2004, now Pat. No. 7,136,655, and a continuation-in-part of application No. 10/615,208, filed on Jul. 7, 2003, now Pat. No. 7,248,877.

(60) Provisional application No. 60/492,017, filed on Aug. 1, 2003, provisional application No. 60/428,456, filed on Nov. 21, 2002.

(51) Int. Cl.
*H04W 72/00* (2009.01)

(52) U.S. Cl.
USPC .......................... 455/450; 370/329; 455/447

(58) Field of Classification Search
None
See application file for complete search history.

(56) References Cited

To view the complete listing of prior art documents cited during the proceeding for Reexamination Control Number 95/001,713, please refer to the USPTO's public Patent Application Information Retrieval (PAIR) system under the Display References tab.

*Primary Examiner* — Kenneth J Whittington

(57) ABSTRACT

A multiple access wireless communications architecture provides selective, simultaneous communications with wireless devices located in different sections of a spatial area around a communications apparatus referred to as "sectors". In one embodiment, channel allocation techniques for increasing one or more of throughput and coverage in a wireless communications environment. In one embodiment, a mode of operation is selected from a plurality of modes of operation, enabling a wireless communications transmitter to be dynamically configured to reach a wireless communications devices at a greater distance from the transmitter without increased interference between communications channels ("range mode") or to provide wireless communications to a greater number of wireless communications devices within a relatively closer distance to the wireless transmitter ("capacity mode") or to provide wireless communications using a single channel to provide wireless communications at a relatively greatest distance from the transmitter ("super range mode").

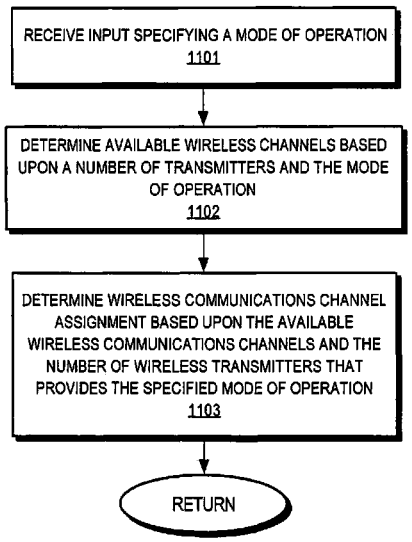

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14 and 15 is confirmed.

Claims 1-13 and 16-18 are cancelled.

New claims 19-62 are added and determined to be patentable.

*19. A method for assigning wireless communications channels to a plurality of wireless communications transmitters of a wireless access point, comprising:*

*receiving an input specifying a mode of operation for the wireless access point, wherein the mode of operation is one of a plurality of modes of operation including a range mode and a capacity mode, wherein the range mode enables the wireless access point to operate with greater range than when operating in the capacity mode and wherein the capacity mode enables the wireless access point to provide greater bandwidth than when operating in the range mode;*

*determining a plurality of available wireless communications channels based upon a number of wireless communications transmitters in the plurality of wireless communications transmitters and the mode of operation;*

*in response to the input specifying the range mode, automatically assigning a first set of wireless communications channels to the plurality of wireless communications transmitters based upon the plurality of available wireless communications channels, wherein the wireless communications channels in the first set of wireless communications channels have a high degree of isolation relative to each other to enable one or more of the plurality of wireless communications transmitters to transmit at a higher power level than when the wireless access point is operating in the capacity mode without significantly interfering with each other;*

*further in response to the input specifying the range mode, causing at least two of the wireless communications transmitters in the plurality of wireless communications transmitters to transmit at the higher power level to enable the wireless access point to operate with greater range; and*

*in response to the input specifying the capacity mode, automatically assigning a second set of wireless communications channels to the plurality of wireless communications transmitters based upon the plurality of available wireless communications channels, wherein the wireless communications channels in the second set of wireless communications channels have a lesser degree of isolation relative to each other than the wireless communications channels in the first set of wireless communications channels, and wherein the second set of wireless communications channels has a greater number of distinct communications channels than the first set of wireless communications channels to enable the wireless access point to provide greater bandwidth than when operating in the range mode.*

*20. The method of claim 19, wherein the wireless communications channels in the first set of wireless communications channels are selected from the plurality of available wireless communications channels, and wherein the wireless communications channels in the first set of wireless communications channels have a greatest frequency separation relative to the plurality of available wireless communications channels.*

*21. The method of claim 20, wherein the wireless communications channels in the second set of wireless communications channels are selected from the plurality of available wireless communications channels, and wherein the wireless communications channels in the second set of wireless communications channels have a greatest bandwidth relative to the plurality of available wireless communications channels.*

*22. The method of claim 19, wherein the wireless communications channels in the first set of wireless communications channels do not overlap with each other.*

*23. The method of claim 22, wherein at least two of the wireless communications channels in the second set of wireless communications channels have overlapping frequencies.*

*24. The method of claim 19, wherein assigning the first set of wireless communications channels to the plurality of wireless communications transmitters comprises assigning a particular communications channel in the first set of wireless communications channels to at least two wireless communications transmitters in the plurality of wireless communications transmitters, wherein the at least two wireless communications transmitters are in adjacent sectors of a spatial area.*

*25. The method of claim 24, wherein the at least two wireless communications transmitters to which the particular communications channel is assigned implement a multiple access communications protocol to determine availability of the particular channel prior to transmitting on the particular channel.*

*26. The method of claim 19, wherein assigning the second set of wireless communications channels to the plurality of wireless communications transmitters comprises:*

*if a number of distinct wireless communications channels in the second set of wireless communications channels is greater than or equal to a number of wireless communications transmitters in the plurality of wireless communications transmitters, assigning a different wireless communications channel to each wireless communications transmitter in the plurality of wireless communications transmitters; and*

*otherwise, assigning at least a particular communications channel in the second set of wireless communications channels to two or more wireless communications transmitters in the plurality of wireless communications transmitters.*

*27. The method of claim 26, wherein the two or more wireless communications transmitters to which the particular communications channel is assigned implement a multiple access communications protocol to determine availability of the particular communications channel prior to transmitting on the particular communications channel.*

*28. The method of claim 19, wherein the plurality of modes of operation further includes a super range mode that enables the wireless access point to operate with even greater range than when operating in the range mode, and wherein the method further comprises:* in response to the input specifying super range mode, automatically assigning a single wireless communications channel to all of the plurality of wireless communications transmitters.

29. The method of claim 19, wherein the first and second sets of wireless communications channels have at least one channel in common.

30. A wireless access point, comprising:
a plurality of antenna elements, each antenna element effecting wireless communication in a sector of a spatial area surrounding the wireless access point; and
a management mechanism configured to automatically assign wireless communications channels to the plurality of antenna elements, the management mechanism configured to perform the operations of:
receiving an input specifying a mode of operation for the wireless access point, wherein the mode of operation is one of a plurality of modes of operation including range mode and a capacity mode, wherein the range mode enables the wireless access point to operate with greater range than when operating in the capacity mode and wherein the capacity mode enables the wireless access point to provide greater bandwidth than when operating in the range mode;
determining a plurality of available wireless communications channels based upon a number of antenna elements in the plurality of antenna elements and the mode of operation;
in response to the input specifying the range mode, automatically assign a first set of wireless communications channels to the plurality of antenna elements based upon the plurality of available wireless communications channels, wherein the wireless communications channels in the first set of wireless communications channels have a high degree of isolation relative to each other to enable one or more of the plurality of antenna elements to transmit at a higher power level than when the wireless access point is operating in the capacity mode without significantly interfering with each other;
further in response to the input specifying the range mode, causing at least two of the antenna elements in the plurality of antenna elements to transmit at the higher power level to enable the wireless access point to operate with greater range; and
in response to the input specifying the capacity mode, automatically assign a second set of wireless communications channels to the plurality of antenna elements based upon the plurality of available wireless communications channels, wherein the wireless communications channels in the second set of wireless communications channels have a lesser degree of isolation relative to each other than the wireless communications channels in the first set of wireless communications channels, and wherein the second set of wireless communications channels has a greater number of distinct communications channels than the first set of wireless communications channels to enable the wireless access point to provide greater bandwidth than when operating in the range mode.

31. The wireless access point of claim 30, wherein the wireless communications channels in the first set of wireless communications channels are selected from the plurality of available wireless communications channels, and wherein the wireless communications channels in the first set of wireless communications channels have a greatest frequency separation relative to the plurality of available wireless communications channels.

32. The wireless access point of claim 31, wherein the wireless communications channels in the second set of wireless communications channels are selected from the plurality of available wireless communications channels, and wherein the wireless communications channels in the second set of wireless communications channels have a greatest bandwidth relative to the plurality of available wireless communications channels.

33. The wireless access point of claim 30, wherein the wireless communications channels in the first set of wireless communications channels do not overlap with each other.

34. The wireless access point of claim 33, wherein at least two of the wireless communications channels in the second set of wireless communications channels have overlapping frequencies.

35. The wireless access point of claim 30, wherein assigning the first set of wireless communications channels to the plurality of antenna elements comprises assigning a particular communications channel in the first set of wireless communications channels to at least two antenna elements in the plurality of antenna elements, wherein the at least two antenna elements are in adjacent sectors of a spatial area.

36. The wireless access point of claim 35, wherein the at least two antenna elements to which the particular communications channel is assigned implement a multiple access communications protocol to determine availability of the particular channel prior to transmitting on the particular channel.

37. The wireless access point of claim 30, wherein assigning the second set of wireless communications channels to the plurality of antenna elements comprises:
if a number of distinct wireless communications channels in the second set of wireless communications channels is greater than or equal to a number of antenna elements in the plurality of antenna elements, assigning a different wireless communications channel to each antenna elements in the plurality of antenna elements; and
otherwise, assigning at least a particular communications channel in the second set of wireless communications channels to two or more antenna elements in the plurality of antenna elements.

38. The wireless access point of claim 37, wherein the two or more antenna elements to which the particular communications channel is assigned implement a multiple access communications protocol to determine availability of the particular communications channel prior to transmitting on the particular communications channel.

39. The wireless access point of claim 30, wherein the plurality of modes of operation further includes a super range mode that enables the wireless access point to operate with even greater range than when operating in the range mode, and wherein the management mechanism is configured to further perform the operation of:
in response to the input specifying super range mode, automatically assigning a single wireless communications channel to all of the plurality of antenna elements.

40. The wireless access point of claim 30, wherein the first and second sets of wireless communications channels have at least one channel in common.

41. A computer readable storage medium storing instructions which, when executed by one or more processors, cause the one or more processors to perform the operations of:
receiving an input specifying a mode of operation for a wireless access point, wherein the mode of operation is one of a plurality of modes of operation including a range mode and a capacity mode, wherein the range mode enables the wireless access point to operate with greater range than when operating in the capacity mode and wherein the capacity mode enables the wireless access point to provide greater bandwidth than when operating in the range mode;

determining a plurality of available wireless communications channels based upon a number of wireless communications transmitters in a plurality of wireless communications transmitters of the wireless access point and the mode of operation;

in response to the input specifying the range mode, automatically assign a first set of wireless communications channels to the plurality of wireless communications transmitters based upon the plurality of available wireless communications channels, wherein the wireless communications channels in the first set of wireless communications channels have a high degree of isolation relative to each other to enable one or more of the plurality of wireless communications transmitters to transmit at a higher power level than when the wireless access point is operating in the capacity mode without significantly interfering with each other;

further in response to the input specifying the range mode, causing at least two of the wireless communications transmitters in the plurality of wireless communications transmitters to transmit at the higher power level to enable the wireless access point to operate with greater range; and in response to the input specifying the capacity mode, automatically assign a second set of wireless communications channels to the plurality of wireless communications transmitters based upon the plurality of available wireless communications channels, wherein the wireless communications channels in the second set of wireless communications channels have a lesser degree of isolation relative to each other than the wireless communications channels in the first set of wireless communications channels, and wherein the second set of wireless communications channels has a greater number of distinct communications channels than the first set of wireless communications channels to enable the wireless access point to provide greater bandwidth than when operating in the range mode.

42. The computer readable storage medium of claim 41, wherein the wireless communications channels in the first set of wireless communications channels are selected from the plurality of available wireless communications channels, and wherein the wireless communications channels in the first set of wireless communications channels have a greatest frequency separation relative to the plurality of available wireless communications channels.

43. The computer readable storage medium of claim 42, wherein the wireless communications channels in the second set of wireless communications channels are selected from the plurality of available wireless communications channels, and wherein the wireless communications channels in the second set of wireless communications channels have a greatest bandwidth relative to the plurality of available wireless communications channels.

44. The computer readable storage medium of claim 41, wherein the wireless communications channels in the first set of wireless communications channels do not overlap with each other.

45. The computer readable storage medium of claim 44, wherein at least two of the wireless communications channels in the second set of wireless communications channels have overlapping frequencies.

46. The computer readable storage medium of claim 41, wherein assigning the first set of wireless communications channels to the plurality of wireless communications transmitters comprises assigning a particular communications channel in the first set of wireless communications channels to at least two wireless communications transmitters in the plurality of wireless communications transmitters, wherein the at least two wireless communications transmitters are in adjacent sectors of a spatial area.

47. The computer readable storage medium of claim 46, wherein the at least two wireless communications transmitters to which the particular communications channel is assigned implement a multiple access communications protocol to determine availability of the particular channel prior to transmitting on the particular channel.

48. The computer readable storage medium of claim 41, wherein assigning the second set of wireless communications channels to the plurality of wireless communications transmitters comprises:

if a number of distinct wireless communications channels in the second set of wireless communications channels is greater than or equal to a number of wireless communications transmitters in the plurality of wireless communications transmitters, assigning a different wireless communications channel to each wireless communications transmitter in the plurality of wireless communications transmitters; and otherwise, assigning at least a particular communications channel in the second set of wireless communications channels to two or more wireless communications transmitters in the plurality of wireless communications transmitters.

49. The computer readable storage medium of claim 48, wherein the two or more wireless communications transmitters to which the particular communications channel is assigned implement a multiple access communications protocol to determine availability of the particular communications channel prior to transmitting on the particular communications channel.

50. The computer readable storage medium of claim 41, wherein the plurality of modes of operation further includes a super range mode that enables the wireless access point to operate with even greater range than when operating in the range mode, and wherein the instructions cause the one or more processors to further perform the operation of:

in response to the input specifying super range mode, automatically assigning a single wireless communications channel to all of the plurality of wireless communications transmitters.

51. The computer readable storage medium of claim 41, wherein the first and second sets of wireless communications channels have at least one channel in common.

52. An apparatus, comprising:

means for receiving an input specifying a mode of operation for a wireless access point, wherein the mode of operation is one of a plurality of modes of operation including a range mode and a capacity mode, wherein the range mode enables the wireless access point to operate with greater range than when operating in the capacity mode and wherein the capacity mode enables the wireless access point to provide greater bandwidth than when operating in the range mode;

means for determining a plurality of available wireless communications channels based upon a number of wireless communications transmitters in a plurality of wireless communications transmitters of the wireless access point and the mode of operation;

means for automatically assigning, in response to the input specifying the range mode, a first set of wireless communications channels to a plurality of wireless communications transmitters based upon the plurality of available wireless communications channels, wherein the wireless communications channels in the first set of wireless communications channels have a high degree of isolation relative to each other to enable one or more of the plurality of wireless communications transmitters to transmit at a higher power level than when the wireless access point is operating in the capacity mode without significantly interfering with each other;

means for causing, further in response to the input specifying the range mode, at least two of the wireless communications transmitters in the plurality of wireless communications transmitters to transmit at the higher power level to enable the wireless access point to operate with greater range; and means for automatically assigning, in response to the input specifying the capacity mode, a second set of wireless communications channels to the plurality of wireless communications transmitters based upon the plurality of available wireless communications channels, wherein the wireless communications channels in the second set of wireless communications channels have a lesser degree of isolation relative to each other than the wireless communications channels in the first set of wireless communications channels, and wherein the second set of wireless communications channels has a greater number of distinct communications channels than the first set of wireless communications channels to enable the wireless access point to provide greater bandwidth than when operating in the range mode.

53. The apparatus of claim 52, wherein the wireless communications channels in the first set of wireless communications channels are selected from the plurality of available wireless communications channels, and wherein the wireless communications channels in the first set of wireless communications channels have a greatest frequency separation relative to the plurality of available wireless communications channels.

54. The apparatus of claim 53, wherein the wireless communications channels in the second set of wireless communications channels are selected from the plurality of available wireless communications channels, and wherein the wireless communications channels in the second set of wireless communications channels have a greatest bandwidth relative to the plurality of available wireless communications channels.

55. The apparatus of claim 52, wherein the wireless communications channels in the first set of wireless communications channels do not overlap with each other.

56. The apparatus of claim 55, wherein at least two of the wireless communications channels in the second set of wireless communications channels have overlapping frequencies.

57. The apparatus of claim 52, wherein the means for assigning the first set of wireless communications channels to the plurality of wireless communications transmitters comprises means for assigning a particular communications channel in the first set of wireless communications channels to at least two wireless communications transmitters in the plurality of wireless communications transmitters, wherein the at least two wireless communications transmitters are in adjacent sectors of a spatial area.

58. The apparatus of claim 57, wherein the at least two wireless communications transmitters to which the particular communications channel is assigned implement a multiple access communications protocol to determine availability of the particular channel prior to transmitting on the particular channel.

59. The apparatus of claim 52, wherein the means for assigning the second set of wireless communications channels to the plurality of wireless communications transmitters comprises:

means for assigning, if a number of distinct wireless communications channels in the second set of wireless communications channels is greater than or equal to a number of wireless communications transmitters in the plurality of wireless communications transmitters, a different wireless communications channel to each wireless communications transmitter in the plurality of wireless communications transmitters; and means for assigning, if the number of distinct wireless communications channels in the second set of wireless communications channels is not greater than or equal to the number of wireless communications transmitters in the plurality of wireless communications transmitters, at least a particular communications channel in the second set of wireless communications channels to two or more wireless communications transmitters in the plurality of wireless communications transmitters.

60. The apparatus of claim 59, wherein the two or more wireless communications transmitters to which the particular communications channel is assigned implement a multiple access communications protocol to determine availability of the particular communications channel prior to transmitting on the particular communications channel.

61. The apparatus of claim 52, wherein the plurality of modes of operation further includes a super range mode that enables the wireless access point to operate with even greater range than when operating in the range mode, and wherein the apparatus further comprises:

means for automatically assigning, in response to the input specifying super range mode, a single wireless communications channel to all of the plurality of wireless communications transmitters.

62. The apparatus of claim 52, wherein the first and second sets of wireless communications channels have at least one channel in common.

* * * * *